(12) United States Patent
Luo et al.

(10) Patent No.: US 12,375,234 B2
(45) Date of Patent: Jul. 29, 2025

(54) COMMUNICATION METHOD, DEVICE, AND SYSTEM

(71) Applicant: HUAWEI TECHNOLOGIES CO., LTD., Guangdong (CN)

(72) Inventors: Zhihu Luo, Beijing (CN); Jun Li, Shanghai (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 17/707,740

(22) Filed: Mar. 29, 2022

(65) Prior Publication Data

US 2022/0224478 A1     Jul. 14, 2022

Related U.S. Application Data

(63) Continuation of application No. PCT/CN2019/116888, filed on Nov. 8, 2019.

(30) Foreign Application Priority Data

Sep. 29, 2019   (WO) ................ PCT/CN2019/109248

(51) Int. Cl.
    *H04L 5/00*      (2006.01)
    *H04W 72/0446*   (2023.01)

(52) U.S. Cl.
    CPC ....... *H04L 5/0048* (2013.01); *H04W 72/0446* (2013.01)

(58) Field of Classification Search
    CPC ... H04L 5/0048; H04L 5/0073; H04L 5/0053; H04L 5/0094; H04W 72/0446; H04W 72/23
    See application file for complete search history.

(56) References Cited

U.S. PATENT DOCUMENTS

| 2018/0020432 | A1  | 1/2018  | Rico Alvarino et al. |
| 2019/0349904 | A1* | 11/2019 | Kwak ................... H04L 69/324 |
| 2021/0219289 | A1* | 7/2021  | Lin .................... H04W 72/0446 |

FOREIGN PATENT DOCUMENTS

| CN | 108633021 A | 10/2018 |
| CN | 108811120 A | 11/2018 |

(Continued)

OTHER PUBLICATIONS

3GPP TSG RAN WG1 Meeting #96bis, R1-1904354, Coexistence of NB-IoT with NR,ZTE ,Xi an, China, 8th Apr. 12, 2019, total 4 pages.

(Continued)

*Primary Examiner* — Dady Chery

(57) ABSTRACT

Embodiments of this application provide a communication method, device, and system. When a resource is reserved, a conflict between a reference signal of a terminal device and data transmission of another terminal device can be avoided, and impact on channel estimation performance of the terminal device can be avoided. In an embodiment, a network device determines resource configuration information, and sends the resource configuration information to the terminal device. The terminal device receives the resource configuration information, and determines, based on the resource configuration information, a symbol that corresponds to a first resource and that is in a first time unit. The symbol corresponding to the first resource does not include a symbol on which a reference signal is located and that is in the first time unit, and the first resource is not used for data transmission corresponding to the terminal device.

15 Claims, 9 Drawing Sheets

(56) References Cited

FOREIGN PATENT DOCUMENTS

| CN | 109644371 | A  | 4/2019 |
|----|-----------|----|--------|
| CN | 109802803 | A  | 5/2019 |
| CN | 109803414 | A  | 5/2019 |
| IN | 109803320 | A  | 5/2019 |
| WO | 2018151564 | A1 | 8/2018 |

OTHER PUBLICATIONS

Samsung, "Indication of reserved resources", 3GPP TSG RAN WG1 #89 R1-1709039, May 19, 2017,total 3 pages.
ZTE, "Coexistence of NB-IoT with NR", 3GPP TSG RAN WG1 Meeting #96 R1-1901868, Mar. 1, 2019, total 4 pages.
Mediatek Inc., "Coexistence of NB-IoT with NR", 3GPP TSG RAN WG1 Meeting #96bis R1-1904159, Apr. 12, 2019, total 3 pages.
3GPP TS 36.331 V15.7.0 (Sep. 2019), 3rd Generation Partnership Project; Technical Specification Group Radio Access Network;Evolved Universal Terrestrial Radio Access (E-UTRA); Radio Resource Control (RRC);Protocol specification (Release 9), total 962 pages.
3GPP TS 36.211 V14.12.0:3rd Generation Partnership Project;Technical Specification Group Radio Access Network; Evolved Universal Terrestrial Radio Access (E-UTRA); Physical channels and modulation(Release 14),Sep. 2019, total 196 pages.
Ericsson, NR and LTE-M Coexistence. 3GPP TSG RAN WG1 Meeting #94bis, Chengdu, China, Oct. 8-12, 2018, R1-1810188, 7 pages.
ZTE, Coexistence of NB-IoT with NR. 3GPP TSG RAN WG1 Meeting #97, Reno, USA, May 13-17, 2019, R1-1906508, 4 pages.

\* cited by examiner

COMMUNICATION METHOD, DEVICE, AND SYSTEM

CROSS-REFERENCE TO RELATED APPLICATIONS

This application is a continuation of International Application No. PCT/CN2019/116888, filed on Nov. 8, 2019, which claims priority to International Application No. PCT/CN2019/109248, filed on Sep. 29, 2019. The disclosures of the aforementioned applications are hereby incorporated by reference in their entireties.

TECHNICAL FIELD

This application relates to the communication field, and in particular, to a communication method, device, and system.

BACKGROUND

An internet of things (IoT) is "an internet through which things are connected to each other". The IoT extends a user end of the internet to any object, so that any object can perform information exchange and communication. Such a communication manner is also referred to as machine type communication (MTC).

In Release (Rel) 16 of a narrowband internet of things (NB-IoT) system, to enable the NB-IoT system and a new radio (NR) system to better share a spectrum resource, an issue of coexistence of the NB-IoT system and the NR system is discussed, and finally, it is determined that the NB-IoT system can reserve a resource, where the reserved resource may be used by the NR system for scheduling.

However, currently there is no related solution to how to reserve the resource.

SUMMARY

Embodiments of this application provide a communication method, device, and system. When a resource is reserved, a conflict between a reference signal of a terminal device and data of another terminal device can be avoided, and impact on channel estimation performance of the terminal device can be avoided.

To achieve the foregoing objectives, the following technical solutions are used in embodiments of this application.

According to a first aspect, a communication method and a corresponding communication apparatus are provided. In the solution, a terminal device receives resource configuration information from a network device, and determines, based on the resource configuration information, a symbol that corresponds to a first resource and that is in a first time unit. The symbol corresponding to the first resource does not include a symbol on which a reference signal is located and that is in the first time unit, and the first resource is not used for data transmission corresponding to the terminal device. Based on the solution, when a resource is reserved, the symbol on which the reference signal is located is not used as the symbol corresponding to the first resource. Therefore, the network device does not perform data scheduling of another terminal device on the symbol on which the reference signal is located, so that a conflict between the reference signal of the terminal device and data transmission of the another terminal device can be avoided, and impact on channel estimation performance of the terminal device can be avoided.

In an embodiment, the resource configuration information includes indication information corresponding to n symbols in the first time unit other than the symbol on which the reference signal is located, indication information corresponding to a first symbol is used to indicate whether the first symbol is the symbol corresponding to the first resource, the first symbol is one of then symbols, and n is a positive integer.

In the solution, because the resource configuration information does not indicate whether the symbol on which the reference signal is located is the symbol corresponding to the first resource, it is impossible for the terminal device to determine, based on the resource configuration information, that the symbol on which the reference signal is located is the symbol corresponding to the first resource. Therefore, it can be implemented that the symbol corresponding to the first resource does not include the symbol on which the reference signal is located.

In an embodiment, the first time unit includes m symbols, the resource configuration information includes indication information corresponding to the m symbols, indication information corresponding to a second symbol is used to indicate whether the second symbol is the symbol corresponding to the first resource, the second symbol is one of the m symbols, and m is a positive integer; and that a terminal device determines, based on the resource configuration information, a symbol that corresponds to a first resource and that is in a first time unit includes: If the second symbol is the symbol on which the reference signal is located, and the indication information corresponding to the second symbol indicates that the second symbol is the symbol corresponding to the first resource, the terminal device determines that the symbol corresponding to the first resource does not include the second symbol; or if the second symbol is not the symbol on which the reference signal is located, and the indication information corresponding to the second symbol indicates that the second symbol is the symbol corresponding to the first resource, the terminal device determines that the symbol corresponding to the first resource includes the second symbol.

In the solution, even if the resource configuration information indicates that the symbol on which the reference signal is located is the symbol corresponding to the first resource, the terminal device does not determine the symbol on which the reference signal is located as the symbol corresponding to the first resource. This may alternatively be understood as that the terminal device ignores the indication, so that it can be implemented that the symbol that corresponds to the first resource and that is determined by the terminal device based on the resource configuration information does not include the symbol on which the reference signal is located.

In an embodiment, the first time unit includes m symbols, the resource configuration information includes indication information corresponding to the m symbols, indication information corresponding to a third symbol is used to indicate whether the third symbol is the symbol corresponding to the first resource, the third symbol is one of the m symbols, and m is a positive integer; and that a terminal device determines, based on the resource configuration information, a symbol that corresponds to a first resource and that is in a first time unit includes: If the third symbol is the symbol on which the reference signal is located, and the indication information corresponding to the third symbol indicates that the third symbol is the symbol corresponding to the first resource, the terminal device adjusts the symbol on which the reference signal is located from the third symbol to a fourth symbol, and determines that the symbol corresponding to the first resource includes the third symbol; or if the third symbol is not the symbol on which the reference signal is located, and the indication information corresponding to the third symbol indicates that the third symbol is the symbol corresponding to the first resource, the terminal device determines that the symbol corresponding to the first resource includes the third symbol.

In the solution, if the resource configuration information indicates that the symbol on which the reference signal is located is the symbol corresponding to the first resource, the terminal device may adjust the symbol on which the reference signal is located to a symbol, where the resource configuration information indicates that the symbol is not the symbol corresponding to the first resource, so that it can be implemented that the symbol that corresponds to the first resource and that is determined by the terminal device based on the resource configuration information does not include the symbol on which the reference signal is located.

In an embodiment, them symbols include a fifth symbol, the fifth symbol is the symbol on which the reference signal is located, and indication information corresponding to the fifth symbol indicates that the fifth symbol is not the symbol corresponding to the first resource; and the communication method further includes: The terminal device adjusts the symbol on which the reference signal is located from the fifth symbol to a sixth symbol, where a spacing between the fifth symbol and the sixth symbol is equal to a spacing between the third symbol and the fourth symbol.

In the solution, because the terminal device may correspondingly adjust the symbol on which the reference signal is located from the fifth symbol to the sixth symbol, it can be ensured that locations, relative to each other, of at least two symbols on which the reference signal is located remain unchanged compared with locations that are before the adjustment, to avoid a location change of the reference signal. In this way, it is ensured that a set of filtering parameters may be used for channel estimation, and implementation complexity of channel estimation is reduced.

In an embodiment, the communication method further includes: The terminal device receives first indication information from the network device, where the first indication information includes an offset value, and the offset value represents the spacing between the third symbol and the fourth symbol; or the first indication information includes location information of the fourth symbol.

In an embodiment, the communication method further includes: The terminal device discards data carried by the symbol corresponding to the first resource.

In an embodiment, the reference signal includes one or more of the following: a narrowband reference signal NRS, a narrowband positioning reference signal NPRS, a demodulation reference signal DMRS, or a cell-specific reference signal CRS.

In an embodiment, the resource configuration information is determined based on a first subcarrier spacing, the first subcarrier spacing is a largest subcarrier spacing in P subcarrier spacings supported by uplink transmission in a first communication system accessed by the terminal device, and P is a positive integer greater than or equal to 2. Based on the solution, because a larger subcarrier spacing indicates shorter duration of a symbol corresponding to the subcarrier spacing, the reserved resource can be more refined by determining the resource configuration information based on a large subcarrier when the terminal device performs uplink transmission by using the large subcarrier.

According to a second aspect, a communication method and a corresponding communication apparatus are provided. In the solution, the network device determines resource configuration information, and sends the resource configuration information to a terminal device. The resource configuration information is used by the terminal device to determine a symbol that corresponds to a first resource and that is in a first time unit, where the symbol corresponding to the first resource does not include a symbol on which a reference signal is located and that is in the first time unit, and the first resource is not used for data transmission corresponding to the terminal device. For a technical effect brought by the second aspect, refer to the technical effect brought by the first aspect. Details are not described herein again.

In an embodiment, the resource configuration information includes indication information corresponding to n symbols in the first time unit other than the symbol on which the reference signal is located, indication information corresponding to a first symbol is used to indicate whether the first symbol is the symbol corresponding to the first resource, the first symbol is one of then symbols, and n is a positive integer.

In an embodiment, the first time unit includes m symbols, the resource configuration information includes indication information corresponding to the m symbols, indication information corresponding to a second symbol is used to indicate whether the second symbol is the symbol corresponding to the first resource, the second symbol is one of the m symbols, and m is a positive integer; and the communication method further includes: If the second symbol is the symbol on which the reference signal is located, and the indication information corresponding to the second symbol indicates that the second symbol is the symbol corresponding to the first resource, the network device determines that the symbol corresponding to the first resource does not include the second symbol; or if the second symbol is not the symbol on which the reference signal is located, and the indication information corresponding to the second symbol indicates that the second symbol is the symbol corresponding to the first resource, the network device determines that the symbol corresponding to the first resource includes the second symbol.

Based on the solution, it can be implemented that the symbol that corresponds to the first resource and that is determined by the network device based on the resource configuration information does not include the symbol on which the reference signal is located, and the symbol that corresponds to the first resource and that is determined by the network device is consistent with the symbol that corresponds to the first resource and that is determined by the terminal device.

In an embodiment, the first time unit includes m symbols, the resource configuration information includes indication information corresponding to the m symbols, indication information corresponding to a third symbol is used to indicate whether the third symbol is the symbol corresponding to the first resource, the third symbol is one of the m symbols, and m is a positive integer; and the communication method further includes: If the third symbol is the symbol on which the reference signal is located, and the indication information corresponding to the third symbol indicates that the third symbol is the symbol corresponding to the first resource, the network device adjusts the symbol on which the reference signal is located from the third symbol to a fourth symbol, and determines that the symbol corresponding to the first resource includes the third symbol; or if the third symbol is not the symbol on which the reference signal is located, and the indication information corresponding to the third symbol indicates that the third symbol is the symbol corresponding to the first resource, the network device determines that the symbol corresponding to the first resource includes the third symbol.

Based on the solution, it can be implemented that the symbol that corresponds to the first resource and that is determined by the network device based on the resource configuration information does not include the symbol on which the reference signal is located, and the symbol that corresponds to the first resource and that is determined by the network device is consistent with the symbol that corresponds to the first resource and that is determined by the terminal device.

In an embodiment, the m symbols include a fifth symbol, the fifth symbol is the symbol on which the reference signal is located, and indication information corresponding to the fifth symbol indicates that the fifth symbol is not the symbol corresponding to the first resource; and the communication method further includes: The network device adjusts the symbol on which the reference signal is located from the fifth symbol to a sixth symbol, where a spacing between the fifth symbol and the sixth symbol is equal to a spacing between the third symbol and the fourth symbol.

In an embodiment, the communication method further includes: The network device sends first indication information to the terminal device, where the first indication information includes an offset value, and the offset value represents the spacing between the third symbol and the fourth symbol; or the first indication information includes location information of the fourth symbol.

In an embodiment, the communication method further includes: The network device discards data carried by the symbol corresponding to the first resource.

In an embodiment, the reference signal includes one or more of the following: a narrowband reference signal NRS, a narrowband positioning reference signal NPRS, a demodulation reference signal DMRS, or a cell-specific reference signal CRS.

In an embodiment, the resource configuration information is determined based on a first subcarrier spacing, the first subcarrier spacing is a largest subcarrier spacing in P subcarrier spacings supported by uplink transmission in a first communication system accessed by the terminal device, and P is a positive integer greater than or equal to 2. Based on the solution, because a larger subcarrier spacing indicates shorter duration of a symbol corresponding to the subcarrier spacing, a reserved resource can be more refined by determining the resource configuration information based on a large subcarrier when the terminal device performs uplink transmission by using the large subcarrier.

According to a third aspect, a communication apparatus is provided, and is configured to implement the foregoing methods. The communication apparatus may be the terminal device in the foregoing first aspect or a terminal device in the following eleventh aspect, an apparatus including the foregoing terminal device, or an apparatus included in the foregoing terminal device. Alternatively, the communication apparatus may be the network device in the foregoing second aspect or a network device in the following twelfth aspect, an apparatus including the foregoing network device, or an apparatus included in the foregoing network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided, and includes a processor and a memory. The memory is configured to store computer instructions. When the processor executes the instructions, the communication apparatus is enabled to perform the method according to any one of the foregoing aspects, the following eleventh aspect, or the following twelfth aspect. The communication apparatus may be the terminal device in the foregoing first aspect or a terminal device in the following eleventh aspect, an apparatus including the foregoing terminal device, or an apparatus included in the foregoing terminal device. Alternatively, the communication apparatus may be the network device in the foregoing second aspect or a network device in the following twelfth aspect, an apparatus including the foregoing network device, or an apparatus included in the foregoing network device.

According to a fifth aspect, a communication apparatus is provided, and includes a processor. The processor is configured to be coupled to a memory, and perform the method according to any one of the foregoing aspects, the following eleventh aspect, or the following twelfth aspect according to instructions after reading the instructions from the memory. The communication apparatus may be the terminal device in the foregoing first aspect or a terminal device in the following eleventh aspect, an apparatus including the foregoing terminal device, or an apparatus included in the foregoing terminal device. Alternatively, the communication apparatus may be the network device in the foregoing second aspect or a network device in the following twelfth aspect, an apparatus including the foregoing network device, or an apparatus included in the foregoing network device.

According to a sixth aspect, a computer-readable storage medium is provided. The computer-readable storage medium stores instructions. When run on a computer, the instructions enable the computer to perform the method according to any one of the foregoing aspects, the following eleventh aspect, or the following twelfth aspect.

According to a seventh aspect, a computer program product including instructions is provided. When running on a computer, the computer program product enables the computer to perform the method according to any one of the foregoing aspects, the following eleventh aspect, or the following twelfth aspect.

According to an eighth aspect, a communication apparatus (where for example, the communication apparatus may be a chip or a chip system) is provided. The communication apparatus includes a processor, configured to implement the functions in any one of the foregoing aspects, the following eleventh aspect, or the following twelfth aspect. In an embodiment, the communication apparatus further includes a memory, and the memory is configured to store necessary program instructions and data. When the communication apparatus is the chip system, the communication apparatus may include a chip, or may include the chip and another discrete component.

According to a ninth aspect, a communication apparatus is provided, and includes a processor and an interface circuit. The interface circuit may be a code/data read/write interface circuit, and the interface circuit is configured to receive computer-executable instructions (where the computer-executable instructions are stored in a memory, and may be directly read from the memory, or may be read by using another component), and transmit the computer-executable instructions to the processor. The processor is configured to run the computer-executable instructions to perform the method according to any one of the foregoing aspects, the following eleventh aspect, or the following twelfth aspect. The communication apparatus may be the terminal device in the foregoing first aspect or a terminal device in the following eleventh aspect, an apparatus including the foregoing terminal device, or an apparatus included in the foregoing terminal device. Alternatively, the communication apparatus may be the network device in the foregoing second aspect or a network device in the following twelfth aspect, an apparatus including the foregoing network device, or an apparatus included in the foregoing network device.

For technical effects brought by any one of design manners in the third aspect to the ninth aspect, refer to technical effects brought by different design manners in the first aspect, the second aspect, the eleventh aspect, or the twelfth aspect. Details are not described herein again.

According to a tenth aspect, a communication system is provided. The communication system includes the terminal device according to the foregoing first aspect and the network device according to the foregoing second aspect, or the communication system includes the terminal device according to the following eleventh aspect and the network device according to the following twelfth aspect.

According to an eleventh aspect, a communication method and a corresponding communication apparatus are provided. In the solution, a terminal device first determines that a second resource is not used for downlink transmission corresponding to the terminal device and/or that a third resource is not used for uplink transmission corresponding to the terminal device. Then, the terminal device receives downlink control information DCI from a network device, where the DCI is used to schedule N transport blocks TBs and feedback information corresponding to the N TBs, the DCI includes second information and/or third information, the second information is used to indicate that a part or all of second time units corresponding to the second resource can be used during transmission of the N TBs, and the third information is used to indicate that a part or all of third time units corresponding to the third resource can be used during transmission of the feedback information corresponding to the N TBs. In this way, when the DCI includes the second information, the terminal device receives the N TBs from the network device on a first time domain resource based on the second information, where the first time domain resource includes the part or all of the second time units corresponding to the second resource; or when the DCI includes the third information, the terminal device sends the feedback information corresponding to the N TBs to the network device on a second time domain resource based on the third information, where the second time domain resource includes the part or all of the third time units corresponding to the third resource.

Based on the solution, when a reserved resource is not used by a second communication system, it may be dynamically indicated in time by using DCI that the reserved resource may be used for downlink transmission of a first communication system or transmission of feedback information corresponding to downlink data. In this way, the reserved resource can be used to perform data transmission of the first communication system, to avoid a resource waste. In addition, the network device separately indicates, in the DCI, that an uplink reserved resource and/or a downlink reserved resource may be used for data transmission of the first communication system, and implementation is more flexible.

In an embodiment, the communication method further includes: The terminal device receives configuration information from the network device, where the configuration information includes first resource configuration information and/or second resource configuration information. That a terminal device determines that a second resource is not used for downlink transmission corresponding to the terminal device and/or that a third resource is not used for uplink transmission corresponding to the terminal device includes: When the configuration information includes the first resource configuration information, the terminal device determines, based on the first resource configuration information, a second time unit corresponding to the second resource within first duration, where the second resource is not used for the downlink transmission corresponding to the terminal device, and correspondingly, the DCI includes the second information; or when the configuration information includes the second resource configuration information, the terminal device determines, based on the second resource configuration information, a third time unit corresponding to the third resource within second duration, where the third resource is not used for the uplink transmission corresponding to the terminal device, and correspondingly, the DCI includes the third information.

In an embodiment, the DCI further includes first information, and the first information is used to determine a time-frequency resource for transmitting the feedback information corresponding to the N TBs; and the communication method further includes: The terminal device determines the second time domain resource based on the first information.

According to a twelfth aspect, a communication method and a corresponding communication apparatus are provided. In the solution, a network device first determines that a second resource is not used for downlink transmission corresponding to a terminal device and/or that a third resource is not used for uplink transmission corresponding to the terminal device. Then, the network device sends downlink control information DCI to the terminal device, where the DCI is used to schedule N transport blocks TBs and feedback information corresponding to the N TBs, the DCI includes second information and/or third information, the second information is used to indicate that a part or all of second time units corresponding to the second resource can be used during transmission of the N TBs, and the third information is used to indicate that a part or all of third time units corresponding to the third resource can be used during transmission of the feedback information corresponding to the N TBs. In this way, when the DCI includes the second information, the network device sends the N TBs to the terminal device on a first time domain resource, where the first time domain resource includes the part or all of the second time units corresponding to the second resource; or when the DCI includes the third information, the network device receives, from the terminal device on a second time domain resource, the feedback information corresponding to the N TBs, where the second time domain resource includes the part or all of the third time units corresponding to the third resource. For a technical effect brought by the twelfth aspect, refer to the technical effect brought by the eleventh aspect. Details are not described herein again.

In an embodiment, that a network device determines that a second resource is not used for downlink transmission corresponding to a terminal device and/or that a third resource is not used for uplink transmission corresponding to the terminal device includes: The network device determines configuration information, where the configuration information includes first resource configuration information and/or second resource configuration information, the first resource configuration information is used by the terminal device to determine a second time unit corresponding to the second resource within first duration, and the second resource configuration information is used by the terminal device to determine a third time unit corresponding to the third resource within second duration; and when the configuration information includes the first resource configuration information, the network device determines that the second resource is not used for the downlink transmission corresponding to the terminal device, and correspondingly, the DCI includes the second information; or when the configuration information includes the second resource configuration information, the network device determines that the third resource is not used for uplink data corresponding to the terminal device, and correspondingly, the DCI includes the third information.

In an embodiment, the communication method further includes: The network device sends the configuration information to the terminal device.

In an embodiment, the DCI further includes first information, and the first information is used to determine a time-frequency resource for transmitting the feedback information corresponding to the N TBs.

DESCRIPTION OF EMBODIMENTS

Figure 1:
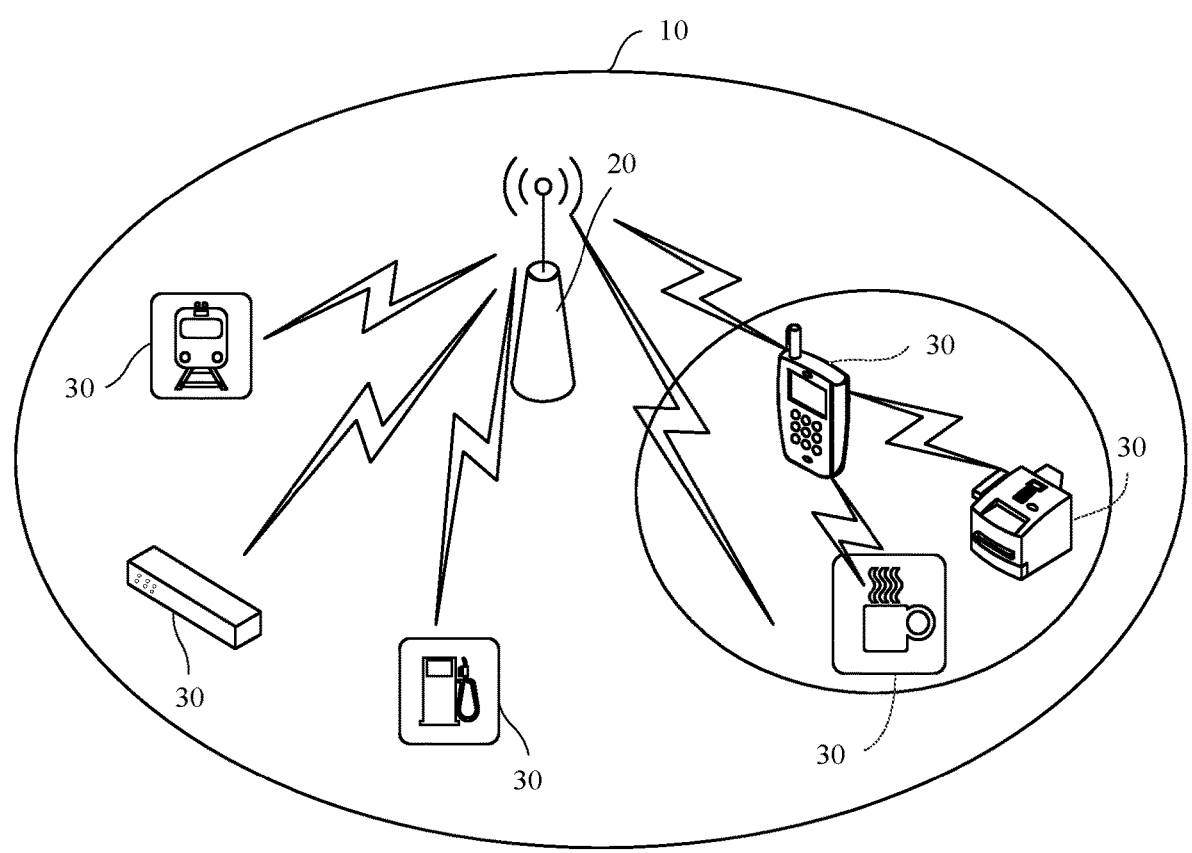
FIG. 1 is a diagram of a communication system according to an embodiment of this application.

For ease of understanding of the technical solutions in embodiments of this application, the following first briefly describes technologies or nouns related to this application.

1. IoT:

The IoT is "an internet through which things are connected to each other". The IoT extends a user end of the internet to any object, so that any object can perform information exchange and communication. Such a communication manner is also referred to as machine type communication (MTC). A communication node is referred to as an IoT terminal or an IoT device. Typical IoT application includes an internet of vehicles, smart communities, industrial detection monitoring, smart meter reading, a smart grid, smart agriculture, smart transportation, smart household, environment detection, and various other aspects.

An internet of things needs to be applied to a plurality of scenarios, for example, an outdoor-to-indoor scenario and an overground-to-underground scenario. Therefore, many special requirements are imposed on a design of the internet of things. For example, an IoT terminal in some scenarios is used in an environment with poor coverage, for example, an electric meter or a water meter is usually installed indoors and even in a place, for example, a basement, with a quite poor wireless network signal. Therefore, a coverage enhancement technology is required to resolve this problem. Alternatively, a quantity of IoT terminals in some scenarios is far greater than a quantity of devices for human-to-human communication. That is, large-scale deployment is required. Therefore, it is required that the IoT terminals be obtained and used at quite low costs. Alternatively, a data packet transmitted by an IoT terminal in some scenarios is quite small, and is insensitive to a latency. Therefore, it is required that an IoT terminal with a low rate be supported. Alternatively, in most cases, an IoT terminal is powered by using a battery. However, in many scenarios, the IoT terminal is required to be used for at least 10 years without replacing the battery. Therefore, it is required that the IoT terminal work with extremely low electric power consumption.

To meet the foregoing requirements, the mobile communications standards organization 3rd generation partnership project (3GPP) adopted a new research project at RAN #62 plenary session to study a method for supporting, in a cellular network, an internet of things having extremely low complexity and low costs. In addition, an NB-IoT project was initiated at the RAN #69 session.

2. NR:

Facing emergence of emerging applications such as MTC communication, smart cities, smart transportation, self driving, virtual reality (VR) terminal devices, and augmented reality (AR), an NR system (which is also referred to as a fifth generation (5G) system) will support three main applications: enhanced mobile broadband (eMBB), ultra-reliable and low-latency communications (URLLC), and massive machine-type communications (mMTC). Currently, in 3GPP R15 and R16, NR is mainly for applications: the eMBB and the URLLC. The eMBB processes a human-centered usage scenario, and involves access of a user to multimedia content, a service, and data. The eMBB will satisfy requirements of explosive growth of data traffic and an increase in a user quantity, is dedicated to providing better user experience, and can support a higher rate, and a lower latency compared with a long term evolution (LTE) system (which is also referred to as a fourth generation (4G) system).

The following describes technical solutions in embodiments of this application with reference to the accompanying drawings in embodiments of this application. In descriptions of this application, unless otherwise specified, "I" represents an "or" relationship between associated objects. For example, A/B may represent A or B. In this application, "and/or" describes only an association relationship between associated objects and represents that three relationships may exist. For example, A and/or B may represent the following three cases: Only A exists, both A and B exist, and only B exists, where A or B may be singular or plural. In addition, in the descriptions of this application, "a plurality of" means two or more than two, unless otherwise specified. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a relative concept in a specific manner for ease of understanding.

Embodiments of this application are applicable to an LTE system, for example, an NB-IoT system, or are applicable to another wireless communication system, for example, a global system for mobile communications (GSM), a universal mobile telecommunications system (UMTS), a code division multiple access (CDMA) system, a wideband code division multiple access (WCDMA) system, a 5G network system, and a future-oriented new network system. This is not specifically limited in embodiments of this application. The foregoing communication systems used in this application are merely examples for description, and communication systems used in this application are not limited thereto. A general description is provided herein. Details are not described below again. In addition, the terms "system" and "network" are interchangeable.

FIG. 1 shows a communication system 10 according to an embodiment of this application. The communication system 10 includes one network device 20 and one or more terminal devices 30 connected to the network device 20. Optionally, different terminal devices 30 may communicate with each other.

An example in which the network device 20 and any terminal device 30 shown in FIG. 1 interact with each other is used. In this embodiment of this application, the network device 20 determines resource configuration information, and sends the resource configuration information to the terminal device 30. The terminal device 30 receives the resource configuration information from the network device 20, and determines, based on the resource configuration information, a symbol that corresponds to a first resource and that is in a first time unit. The symbol corresponding to the first resource does not include a symbol on which a reference signal is located and that is in the first time unit, and the first resource is not used for data transmission corresponding to the terminal device 30. Based on the solution, when a resource is reserved, the symbol on which the reference signal is located is not used as the symbol corresponding to the first resource. Therefore, the network device does not perform data scheduling of another terminal device on the symbol on which the reference signal is located, so that a conflict between the reference signal corresponding to the terminal device 30 and data transmission of the another terminal device can be avoided, and impact on channel estimation performance of the terminal device 30 and data transmission performance of the another terminal device due to the conflict can be avoided.

Optionally, the network device 20 in this embodiment of this application is a device for connecting the terminal device 30 to a wireless network, and may be an evolved NodeB (eNB, or eNodeB) in LTE, a base transceiver station (BTS) in a GSM or CDMA, a NodeB (NodeB) in a WCDMA system, a base station in a 5G network or a future evolved public land mobile network (PLMN), a broadband network gateway (BNG), an aggregation switch, a non-third generation partnership project (3GPP) access device, or the like. This is not specifically limited in the embodiments of this application. Optionally, the base station in the embodiments of this application may include base stations in various forms, for example, a macro base station, a micro base station (which is also referred to as a small cell), a relay station, and an access point. This is not specifically limited in the embodiments of this application.

Optionally, the terminal device 30 in this embodiment of this application may be a device, for example, a terminal or a chip that may be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in an LTE network or the future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a VR terminal device, an AR terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

Optionally, the network device 20 and the terminal device 30 in this embodiment of this application may also be referred to as communication apparatuses, and each may be a general-purpose device or a dedicated device. This is not specifically limited in the embodiments of this application.

Figure 2:
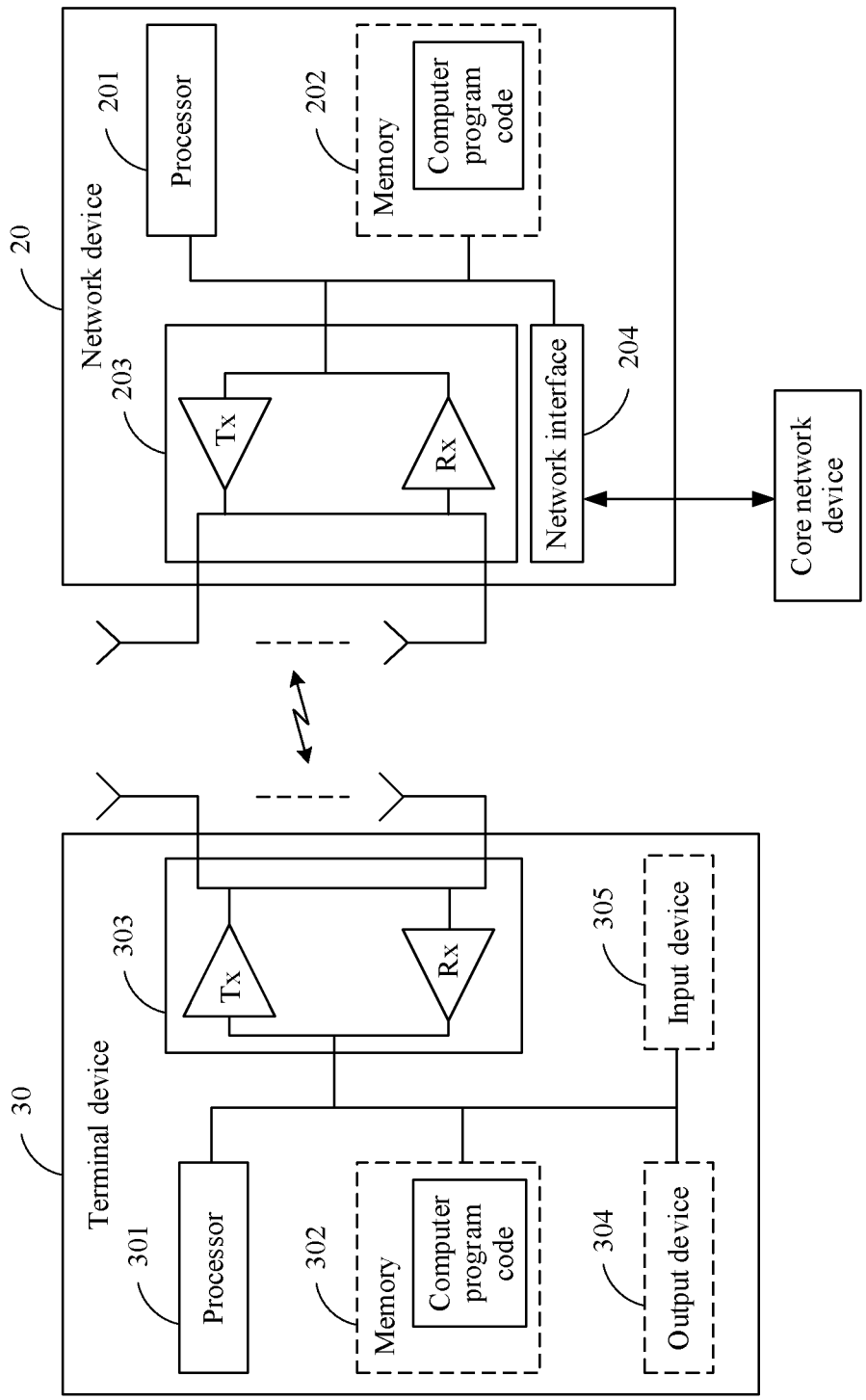
FIG. 2 is a diagram of a terminal device and a network device according to an embodiment of this application.

Optionally, FIG. 2 is a diagram of a network device 20 and a terminal device 30 according to an embodiment of this application.

The terminal device 30 includes at least one processor (an example in which the terminal device 30 includes one processor 301 is used for description in FIG. 2) and at least one transceiver (an example in which the terminal device 30 includes one transceiver 303 is used for description in FIG. 2). Optionally, the terminal device 30 may further include at least one memory (an example in which the terminal device 30 includes one memory 302 is used for description in FIG. 2), at least one output device (an example in which the terminal device 30 includes one output device 304 is used for description in FIG. 2), and at least one input device (an example in which the terminal device 30 includes one input device 305 is used for description in FIG. 2).

The processor 301, the memory 302, and the transceiver 303 are connected through a communication line. The communication line may include a path for transmitting information between the foregoing components.

The processor 301 may be a general-purpose central processing unit (CPU), a microprocessor, an application-specific integrated circuit (ASIC), or one or more integrated circuits configured to control program execution of the solutions in this application. During implementation, in an embodiment, the processor 301 may alternatively include a plurality of CPUs, and the processor 301 may be a single-core (single-CPU) processor or a multi-core (multi-CPU) processor. The processor herein may refer to one or more devices, circuits, or processing cores configured to process data (for example, computer program instructions).

The memory 302 may be an apparatus having a storage function. For example, the memory 302 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage device, an optical disc storage device (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory 302 may exist independently, and is connected to the processor 301 through the communication line. The memory 302 may alternatively be integrated with the processor 301.

The memory 302 is configured to store computer-executable instructions for executing the solutions in this application, and the processor 301 controls the execution. The processor 301 is configured to execute the computer-executable instructions stored in the memory 302, to implement the communication method in embodiments of this application.

Alternatively, optionally, in this embodiment of this application, the processor 301 may perform processing-related functions in communication methods provided in the following embodiments of this application, and the transceiver 303 is responsible for communication with another device or a communication network. This is not specifically limited in this embodiment of this application.

Optionally, the computer-executable instructions in this embodiment of this application may also be referred to as application program code or computer program code. This is not specifically limited in the embodiments of this application.

The transceiver 303 may be any apparatus such as a transceiver, and is configured to communicate with the another device or the communication network such as the Ethernet, a radio access network (RAN), or a wireless local area network (WLAN). The transceiver 303 includes a transmitter (Tx) and a receiver (Rx).

The output device 304 communicates with the processor 301, and may display information in a plurality of manners. For example, the output device 304 may be a liquid crystal display (LCD), a light emitting diode (LED) display device, a cathode ray tube (CRT) display device, a projector, or the like.

The input device 305 communicates with the processor 301, and may receive an input of a user in a plurality of manners. For example, the input device 305 may be a mouse, a keyboard, a touchscreen device, or a sensor device.

The network device 20 includes at least one processor (an example in which the network device 20 includes one processor 201 is used for description in FIG. 2), at least one transceiver (an example in which the network device 20 includes one transceiver 203 is used for description in FIG. 2), and at least one network interface (an example in which the network device 20 includes one network interface 204 is used for description in FIG. 2). Optionally, the network device 20 may further include at least one memory (an example in which the network device 20 includes one memory 202 is used for description in FIG. 2). The processor 201, the memory 202, the transceiver 203, and the network interface 204 are connected through a communication line. The network interface 204 is configured to connect to a core network device through a link (for example, an S1 interface), or connect to a network interface of another network device through a wired or wireless link (for example, an X2 interface) (not shown in FIG. 2). This is not specifically limited in the embodiments of this application. In addition, for related descriptions of the processor 201, the memory 202, and the transceiver 203, refer to descriptions of the processor 301, the memory 302, and the transceiver 303 in the terminal device 30. Details are not described herein again.

Figure 3:
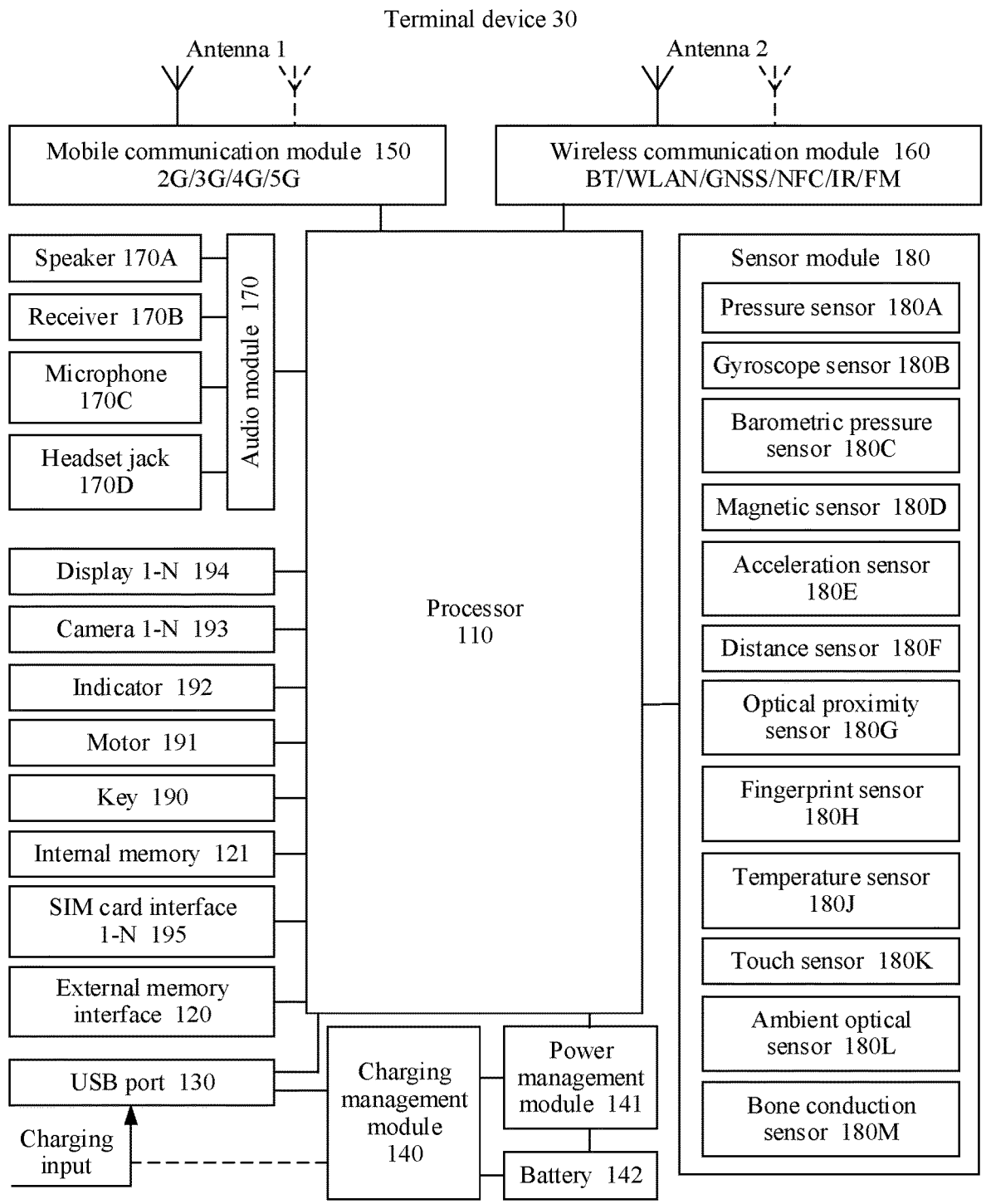
FIG. 3 is a diagram of a terminal device according to an embodiment of this application.

With reference to the diagram of the terminal device 30 shown in FIG. 2, for example, FIG. 3 shows a terminal device 30 according to an embodiment of this application.

In some embodiments, a function of the processor 301 in FIG. 2 may be implemented by using a processor 110 in FIG. 3.

In some embodiments, a function of the transceiver 303 in FIG. 2 may be implemented by using an antenna 1, an antenna 2, a mobile communication module 150, a wireless communication module 160, and the like in FIG. 3.

The antenna 1 and the antenna 2 are configured to transmit and receive electromagnetic wave signals. Each antenna in the terminal device 30 may be configured to cover a single or more communication bands. Different antennas may further be multiplexed, to improve antenna utilization. For example, the antenna 1 may be multiplexed as a diversity antenna in a wireless local area network. In some other embodiments, an antenna may be used in combination with a tuning switch.

The mobile communication module 150 may provide a solution applied to wireless communication including 2G/3G/4G/5G or the like on the terminal device 30. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to a modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The wireless communication module 160 may provide a solution applied to wireless communication including a wireless local area network (WLAN) (for example, a Wi-Fi network), Bluetooth (BT), a global navigation satellite system (GNSS), frequency modulation (FM), near field communication (NFC), an infrared (IR) technology, or the like on the terminal device 30. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2. When the terminal device 30 is a first device, that the wireless communication module 160 may provide a solution applied to NFC wireless communication on the terminal device 30 means that the first device includes an NFC chip. The NFC chip can provide an NFC wireless communication function. When the terminal device 30 is a second device, that the wireless communication module 160 may provide a solution applied to NFC wireless communication on the terminal device 30 means that the second device includes an electronic label (for example, a radio frequency identification (RFID) label). If an NFC chip of another device is close to the electronic label, the another device may perform NFC wireless communication with the second device.

In some embodiments, the antenna 1 of the terminal device 30 is coupled to the mobile communication module 150, and the antenna 2 is coupled to the wireless communication module 160, so that the terminal device 30 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), the BT, the GNSS, the WLAN, the NFC, the FM, the IR technology, or the like. The GNSS may include a global positioning system (GPS), a global navigation satellite system (GLONASS), a BeiDou navigation satellite system (BDS), a quasi-zenith satellite system (QZSS), or satellite based augmentation systems (SBAS).

In some embodiments, a function of the memory 302 in FIG. 2 may be implemented by using an internal memory 121 in FIG. 3, an external memory (for example, a Micro SD card) connected to an external memory interface 120, or the like.

In some embodiments, a function of the output device 304 in FIG. 2 may be implemented by a display 194 in FIG. 3. The display 194 is configured to display an image, a video, and the like. The display 194 includes a display panel.

In some embodiments, a function of the input device 305 in FIG. 2 may be implemented by using a mouse, a keyboard, a touchscreen device, or a sensor module 180 in FIG. 3. For example, as shown in FIG. 3, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in the embodiments of this application.

In some embodiments, as shown in FIG. 3, the terminal device 30 may further include one or more of an audio module 170, a camera 193, an indicator 192, a motor 191, a key 190, a SIM card interface 195, a USB port 130, a charging management module 140, a power management module 141, and a battery 142. The audio module 170 may be connected to a speaker 170A (which is also referred to as a "loudspeaker"), a receiver 170B (which is also referred to as an "earpiece"), a microphone 170C, a headset jack 170D, or the like. This is not specifically limited in the embodiments of this application.

It may be understood that the embodiment shown in FIG. 3 constitute no limitation on the terminal device 30. For example, in some other embodiments of this application, the terminal device 30 may include more or fewer components than those shown in the figure, some components may be combined, some components may be split, or the components may be differently arranged. The components shown in the figure may be implemented by hardware, software, or a combination of the software and the hardware.

With reference to FIG. 1 to FIG. 3, the following describes, by using an example in which the network device 20 and any terminal device 30 shown in FIG. 1 interact with each other, the communication method provided in embodiments of this application.

It should be noted that names of messages between the network elements, names of parameters in the messages, or the like in the following embodiments of this application are merely an example, and there may be other names during implementation. This is not specifically limited in embodiments of this application.

It should be noted that, in embodiments of this application, unless otherwise specified, the "terminal device" refers to a terminal device in a first communication system, and the first communication system may be an NB-IoT system, an enhanced machine type communication (eMTC) system, a long term evolution for machines (LTE-M) system, or an LTE system. The description herein is applicable throughout the entire specification, and details are not described in the following embodiments.

Figure 4:
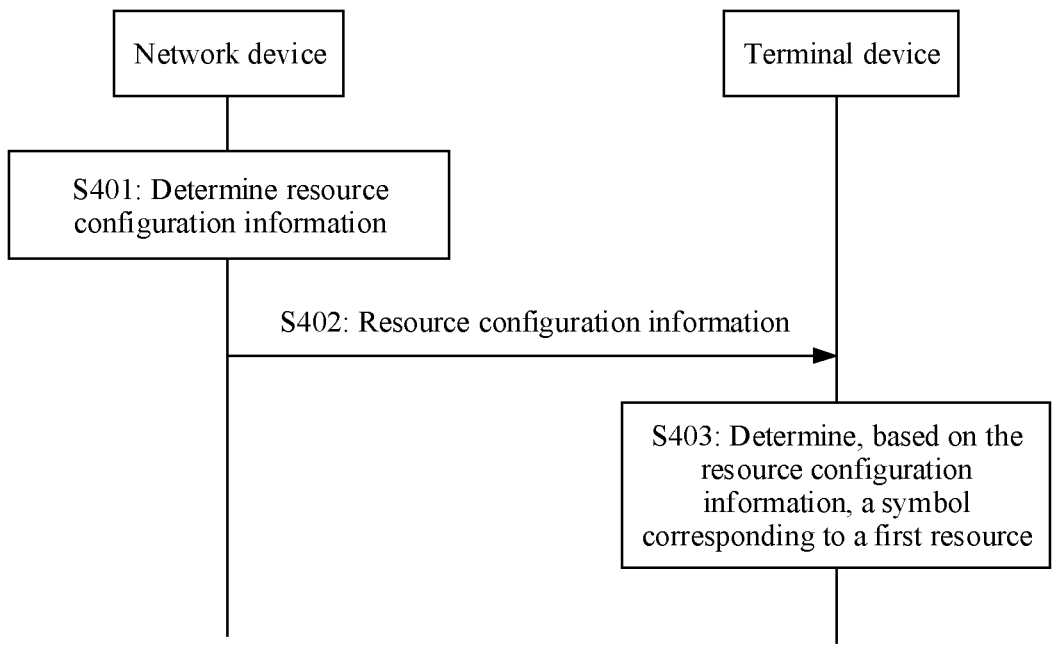
FIG. 4 is a flowchart of a communication method according to an embodiment of this application.

FIG. 4 shows a communication method according to an embodiment of this application. The communication method includes the following steps.

S401: A network device determines resource configuration information.

The resource configuration information is used by a terminal device to determine a symbol that corresponds to a first resource and that is in a first time unit, and the first resource is not used for data transmission corresponding to the terminal device.

In the embodiments of this application, the first resource may also be referred to as a reserved resource, or have another name. This is not specifically limited in the embodiments of this application. That the first resource is not used for data transmission corresponding to the terminal device may be understood as that the first resource is used by a second communication system for scheduling, that the network device may schedule the first resource for a terminal device in the second communication system for use, or that the network device may schedule the first resource for another terminal device in a first communication system for use.

It should be noted that, in the embodiments of this application, the second communication system may be a communication system, for example, an NR system, other than the first communication system. This is not specifically limited in the embodiments of this application.

Optionally, the "first time unit" in the embodiments of this application may include K slots, K subframes, K half-frames, K radio frames (which are also referred to as frames), or K super frames. This is not specifically limited in the embodiments of this application. K is a positive integer. The "symbol" in the embodiments of this application may be an orthogonal frequency division multiplexing (OFDM) symbol or a single carrier frequency division multiple access (SC-FDMA) symbol.

It should be noted that, for the slot, the subframe, the half-frame, the radio frame (which is also referred to as the frame), and the super frame in the embodiments of this application, refer to related definitions in the first communication system, or refer to related definitions in the second communication system.

In different implementations of the embodiments of this application, the resource configuration information determined by the network device may alternatively be different. Details are as follows.

In an embodiment, the resource configuration information determined by the network device includes indication information corresponding to n symbols in the first time unit other than a symbol on which a reference signal is located. Indication information corresponding to a first symbol is used to indicate whether the first symbol is the symbol corresponding to the first resource. The first symbol is one of the n symbols. n is less than m. m is a total quantity of symbols included in the first time unit. Both n and m are positive integers.

That the first symbol is one of then symbols may be understood as that the first symbol is any one of the n symbols. For example, if then symbols are numbered as a symbol 0, a symbol 1, . . . , and a symbol n−1 in a time sequence, the first symbol may be a symbol s, where a value set of s is 0, 1, . . . , and n−1.

Optionally, the indication information corresponding to then symbols may be in a form of a bitmap. One bit in the bitmap may represent indication information corresponding to one symbol, may represent indication information corresponding to a plurality of discrete symbols in the n symbols, or may represent indication information corresponding to a plurality of consecutive symbols in the n symbols. This is not specifically limited in the embodiments of this application.

Figure 5A:
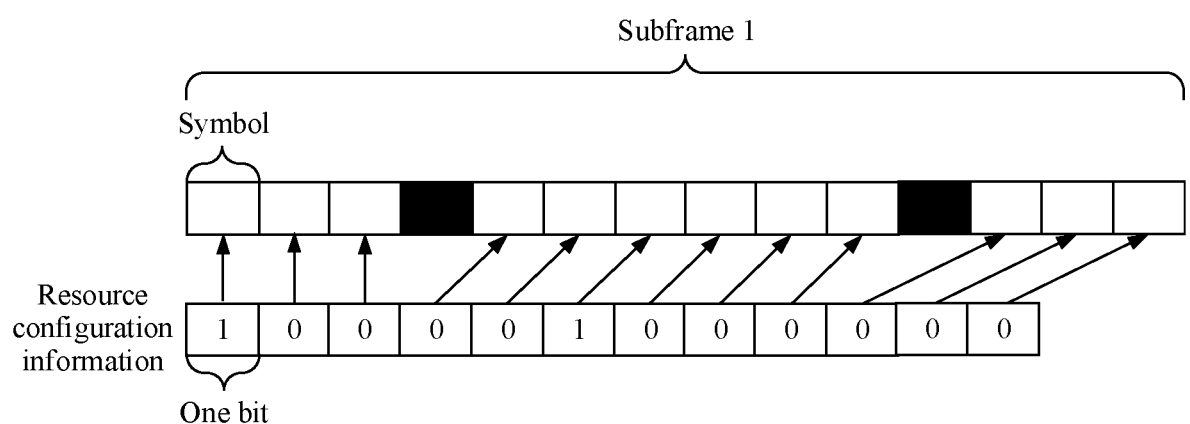
FIG. 5A is a diagram of resource configuration information according to an embodiment of this application.
Figure 5B:
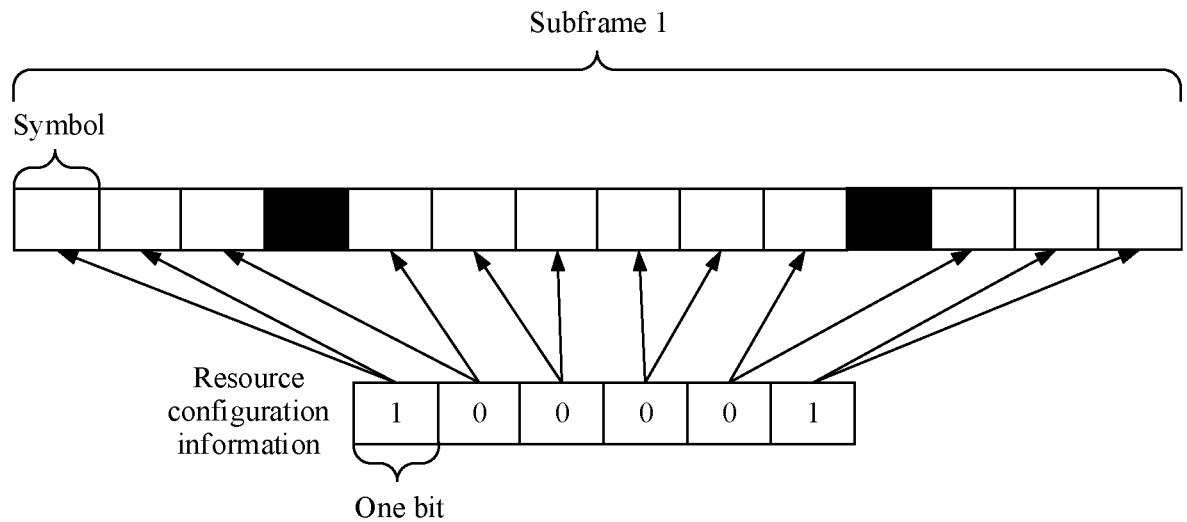
FIG. 5B is a diagram of resource configuration information according to an embodiment of this application.

For example, the first time unit may be a subframe. For example, the first time unit includes a subframe 1, the subframe 1 includes 14 symbols, and symbols on which the reference signal is located are the $4^{th}$ symbol and the $11^{th}$ symbol in the subframe 1, that is, n is 12. As shown in FIG. 5A, in the resource configuration information, indication information corresponding to the 12 symbols may be represented by using a 12-bit bitmap. One bit represents indication information corresponding to one symbol. For example, when the bit is "1", it indicates that the symbol corresponding to the bit is the symbol corresponding to the first resource. When the bit is "0", it indicates that the symbol corresponding to the bit is not the symbol corresponding to the first resource. Alternatively, as shown in FIG. 5B, in the resource configuration information, indication information corresponding to the 12 symbols may be represented by using a 6-bit bitmap. One bit represents indication information corresponding to two consecutive symbols (other than the symbols on which the reference signal is located). For example, when the bit is "1", it indicates that both the two symbols corresponding to the bit are symbols corresponding to the first resource. When the bit is "0", it indicates that neither of the two symbols corresponding to the bit is the symbol corresponding to the first resource. In an embodiment, the first time unit includes m symbols. The resource configuration information determined by the network device includes indication information corresponding to the m symbols. Indication information corresponding to a second symbol is used to indicate whether the second symbol is the symbol corresponding to the first resource, and the second symbol is one of the m symbols. Alternatively, indication information corresponding to a third symbol is used to indicate whether the third symbol is the symbol corresponding to the first resource, and the third symbol is one of the m symbols, where m is a positive integer.

That the second symbol or the third symbol is one of the m symbols may be understood as that the second symbol or the third symbol is any one of the m symbols. For example, if the m symbols are numbered as a symbol 0, a symbol 1, . . . , and a symbol m−1 in a time sequence, the second symbol may be a symbol t1, and the third symbol may be a symbol t2, where a value set of t1 and a value set of t2 are both 0, 1, . . . , and m−1.

Optionally, the indication information corresponding to the m symbols may be in a form of a bitmap. One bit in the bitmap may represent indication information corresponding to one symbol, may represent indication information corresponding to a plurality of discrete symbols in the m symbols, or may represent indication information corresponding to a plurality of consecutive symbols in the m symbols. This is not specifically limited in the embodiments of this application.

Figure 6A:
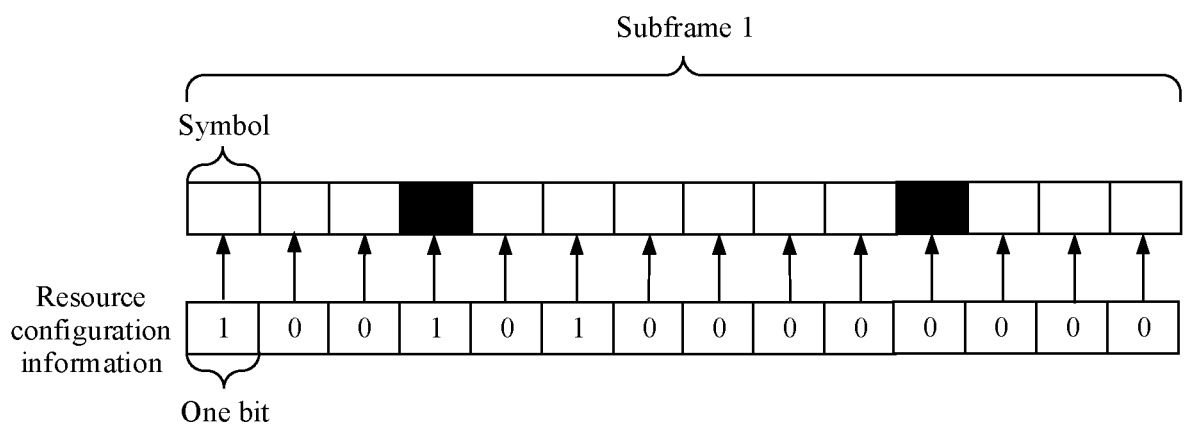
FIG. 6A is a diagram of resource configuration information according to an embodiment of this application.
Figure 6B:
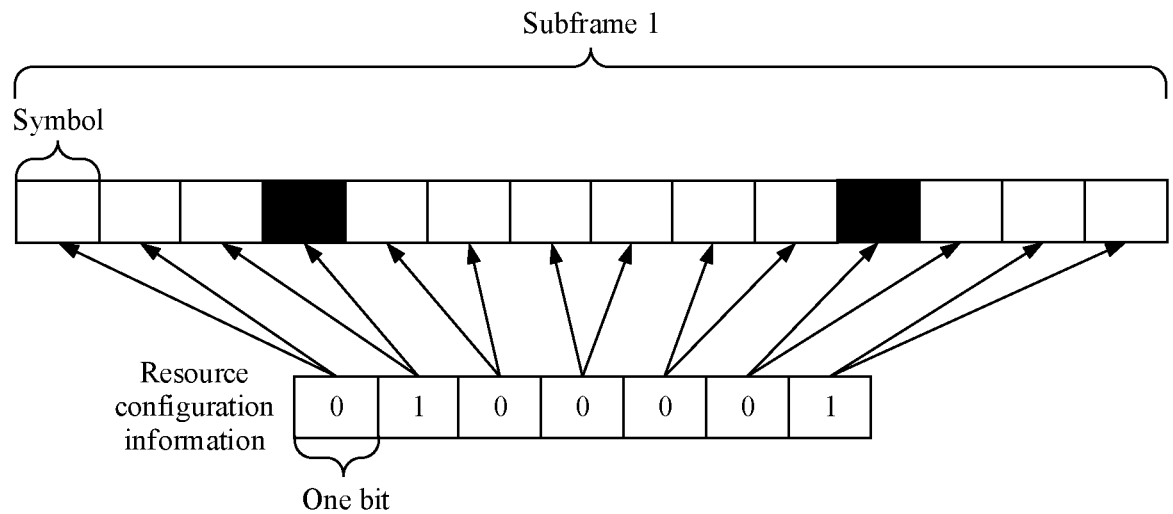
FIG. 6B is a diagram of resource configuration information according to an embodiment of this application.

For example, the first time unit may be a subframe. For example, the first time unit includes a subframe 1, the subframe 1 includes 14 symbols, that is, m is 14, and symbols on which the reference signal is located are the $4^{th}$ symbol and the $11^{th}$ symbol in the subframe 1. As shown in FIG. 6A, in the resource configuration information, indication information corresponding to the 14 symbols may be represented by using a 14-bit bitmap. One bit represents indication information corresponding to one symbol. For example, when the bit is "1", it indicates that the symbol corresponding to the bit is the symbol corresponding to the first resource. When the bit is "0", it indicates that the symbol corresponding to the bit is not the symbol corresponding to the first resource. Alternatively, as shown in FIG. 6B, in the resource configuration information, indication information corresponding to the 14 symbols may be represented by using a 7-bit bitmap. One bit represents indication information corresponding to two consecutive symbols. For example, when the bit is "1", it indicates that both the two symbols corresponding to the bit are symbols corresponding to the first resource. When the bit is "0", it indicates that neither of the two symbols corresponding to the bit is the symbol corresponding to the first resource.

S402: The network device sends the resource configuration information to the terminal device, and correspondingly, the terminal device receives the resource configuration information from the network device.

Optionally, the network device may carry the resource configuration information by using one or more of downlink control information (DCI), a MAC control element (CE), a MAC protocol data unit (PDU), or radio resource control (RRC) signaling.

S403: The terminal device determines, based on the resource configuration information, the symbol corresponding to the first resource.

The symbol corresponding to the first resource does not include the symbol on which the reference signal is located and that is in the first time unit.

Optionally, the reference signal includes one or more of the following: a narrowband reference signal (NRS), a narrowband positioning reference signal (NPRS), a demodulation reference signal (DMRS), or a cell-specific reference signal (CRS).

The NRS and the NPRS are reference signals in an NB-IoT system, the CRS and a PRS are reference signals in an LTE system and an eMTC or LTE-M system, and the DMRS may be a reference signal in the NB-IoT system, may be a reference signal in the LTE system, may be a reference signal in the eMTC or LTE-M system, or may be a demodulation reference signal for different physical channels in an NR system.

In different implementations of the embodiments of this application, based on different resource configuration information, methods for determining, by the terminal device based on the resource configuration information, the symbol corresponding to the first resource may alternatively be different. Details are as follows.

In an embodiment, when the resource configuration information includes the indication information corresponding to the n symbols in the first time unit other than the symbol on which the reference signal is located, the determining, by the terminal device based on the resource configuration information, the symbol corresponding to the first resource may include: If the indication information corresponding to the first symbol indicates that the first symbol is the symbol corresponding to the first resource, the terminal device determines that the symbol corresponding to the first resource includes the first symbol; or if the indication information corresponding to the first symbol indicates that the first symbol is not the symbol corresponding to the first resource, the terminal device determines that the symbol corresponding to the first resource does not include the first symbol, where the first symbol is one of the n symbols.

For example, as shown in FIG. 5A, the terminal device may determine, based on the resource configuration information, that symbols corresponding to the first resource include the $1^{st}$ symbol and the $6^{th}$ symbol in the subframe 1. As shown in FIG. 5B, the terminal device may determine, based on the resource configuration information, that symbols corresponding to the first resource include the $1^{st}$ symbol, the $2^{nd}$ symbol, the $13^{th}$ symbol, and the $14^{th}$ symbol in the subframe 1.

In the solution, because the resource configuration information does not indicate whether the symbol on which the reference signal is located is the symbol corresponding to the first resource, it is impossible for the terminal device to determine, based on the resource configuration information, that the symbol on which the reference signal is located is the symbol corresponding to the first resource. Therefore, it can be implemented that the symbol corresponding to the first resource does not include the symbol on which the reference signal is located.

It should be noted that, in this implementation, the network device may alternatively determine, in a same manner as that of the terminal device, the symbol corresponding to the first resource.

In an embodiment, the first time unit includes the m symbols. When the resource configuration information determined by the network device includes the indication information corresponding to the m symbols, the determining, by the terminal device based on the resource configuration information, the symbol corresponding to the first resource may include: If the second symbol is the symbol on which the reference signal is located, and the indication information corresponding to the second symbol indicates that the second symbol is the symbol corresponding to the first resource, the terminal device determines that the symbol corresponding to the first resource does not include the second symbol; or if the second symbol is not the symbol on which the reference signal is located, and the indication information corresponding to the second symbol indicates that the second symbol is the symbol corresponding to the first resource, the terminal device determines that the symbol corresponding to the first resource includes the second symbol, where the second symbol is one of the m symbols.

For example, as shown in FIG. 6A, because indication information corresponding to the $1^{st}$ symbol in the subframe 1 indicates that the $1^{st}$ symbol is the symbol on which the reference signal is located, and the $1^{st}$ symbol is not the symbol on which the reference signal is located, the terminal device determines that symbols corresponding to the first resource include the $1^{st}$ symbol in the subframe 1; because indication information corresponding to the $4^{th}$ symbol in the subframe 1 indicates that the $4^{th}$ symbol is the symbol on which the reference signal is located, and the $4^{th}$ symbol is the symbol on which the reference signal is located, the terminal device determines that the symbols corresponding to the first resource do not include the $4^{th}$ symbol in the subframe 1; and so on. The terminal device may finally determine, based on the resource configuration information, that the symbols corresponding to the first resource include the $1^{st}$ symbol and the $6^{th}$ symbol in the subframe 1.

In the solution, even if the resource configuration information indicates that the symbol on which the reference signal is located is the symbol corresponding to the first resource, the terminal device does not determine the symbol on which the reference signal is located as the symbol corresponding to the first resource. This may alternatively be understood as that the terminal device ignores the indication, so that it can be implemented that the symbol that corresponds to the first resource and that is determined by the terminal device based on the resource configuration information does not include the symbol on which the reference signal is located.

It should be noted that, in this implementation, the network device may alternatively determine, in a same manner as that of the terminal device, the symbol corresponding to the first resource. If the second symbol is the symbol on which the reference signal is located, and the indication information corresponding to the second symbol indicates that the second symbol is the symbol corresponding to the first resource, the network device determines that the symbol corresponding to the first resource does not include the second symbol; or if the second symbol is not the symbol on which the reference signal is located, and the indication information corresponding to the second symbol indicates that the second symbol is the symbol corresponding to the first resource, the network device determines that the symbol corresponding to the first resource includes the second symbol. Based on the solution, it can be implemented that the symbol that corresponds to the first resource and that is determined by the network device based on the resource configuration information does not include the symbol on which the reference signal is located, and the symbol that corresponds to the first resource and that is determined by the network device is consistent with the symbol that corresponds to the first resource and that is determined by the terminal device.

In an embodiment, the first time unit includes the m symbols. When the resource configuration information determined by the network device includes the indication information corresponding to the m symbols, the determining, by the terminal device based on the resource configuration information, the symbol corresponding to the first resource may include: If the third symbol is the symbol on which the reference signal is located, the indication information corresponding to the third symbol indicates that the third symbol is the symbol corresponding to the first resource, the terminal device adjusts the symbol on which the reference signal is located from the third symbol to a fourth symbol, and determines that the symbol corresponding to the first resource includes the third symbol; or if the third symbol is not the symbol on which the reference signal is located, and the indication information corresponding to the third symbol indicates that the third symbol is the symbol corresponding to the first resource, the terminal device determines that the symbol corresponding to the first resource includes the third symbol, where the third symbol is one of the m symbols.

Optionally, the fourth symbol may be a symbol, where the resource configuration information indicates that the symbol is not the symbol corresponding to the first resource.

Figure 7A:
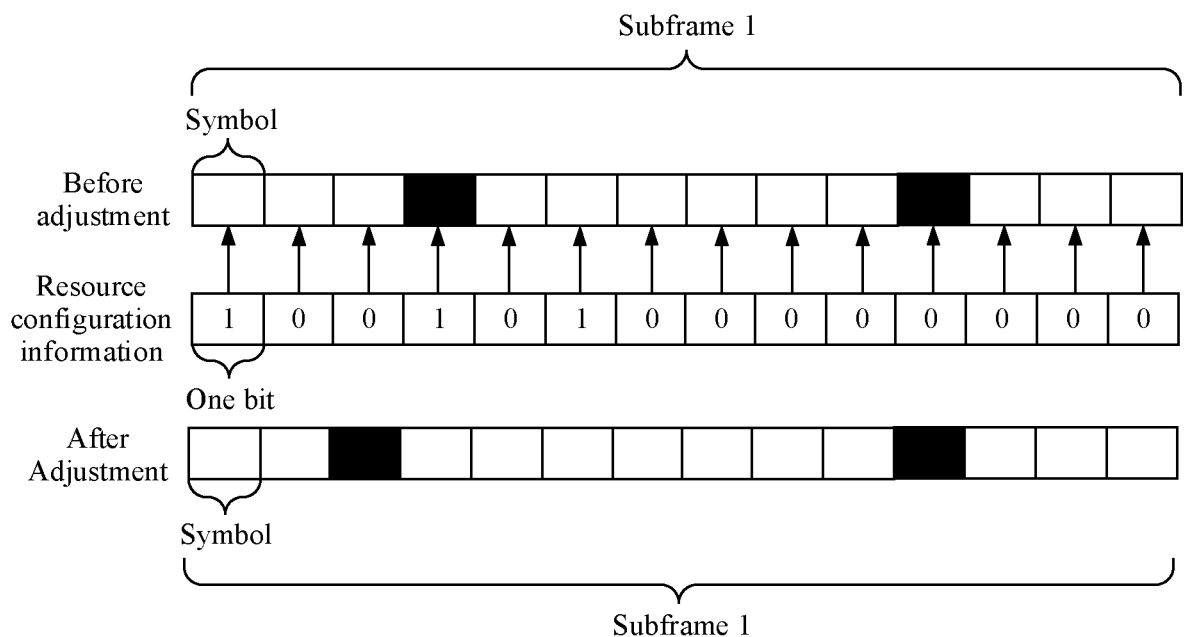
FIG. 7A is a diagram of resource configuration information according to an embodiment of this application.

For example, as shown in FIG. 7A, because the $1^{st}$ symbol in the subframe 1 is not the symbol on which the reference signal is located, and corresponding indication information indicates that the $1^{st}$ symbol is the symbol corresponding to the first resource, the terminal device determines that symbols corresponding to the first resource include the $1^{st}$ symbol in the subframe 1; because the $4^{th}$ symbol in the subframe 1 is the symbol on which the reference signal is located, and indication information corresponding to the $4^{th}$ symbol indicates that the $4^{th}$ symbol is the symbol on which the reference signal is located, the terminal device adjusts the symbol on which the reference signal is located from the $4^{th}$ symbol to the $3^{rd}$ symbol (namely, the fourth symbol), and determines that the symbols corresponding to the first resource include the $4^{th}$ symbol in the subframe 1; and so on. The terminal device may finally determine, based on the resource configuration information, that the symbols corresponding to the first resource include the $1^{st}$ symbol, the $4^{th}$ symbol, and the $6^{th}$ symbol in the subframe 1.

In the solution, if the resource configuration information indicates that the symbol on which the reference signal is located is the symbol corresponding to the first resource, the terminal device may adjust the symbol on which the reference signal is located to a symbol, where the resource configuration information indicates that the symbol is not the symbol corresponding to the first resource, so that it can be implemented that the symbol that corresponds to the first resource and that is determined by the terminal device based on the resource configuration information does not include the symbol on which the reference signal is located.

It should be noted that, in this implementation, the network device may alternatively determine, in a same manner as that of the network device, the symbol corresponding to the first resource. If the third symbol is the symbol on which the reference signal is located, and the indication information corresponding to the third symbol indicates that the third symbol is the symbol corresponding to the first resource, the network device adjusts the symbol on which the reference signal is located from the third symbol to the fourth symbol, and determines that the symbol corresponding to the first resource includes the third symbol; or if the third symbol is not the symbol on which the reference signal is located, and the indication information corresponding to the third symbol indicates that the third symbol is the symbol corresponding to the first resource, the network device determines that the symbol corresponding to the first resource includes the third symbol. Based on the solution, it can be implemented that the symbol that corresponds to the first resource and that is determined by the network device based on the resource configuration information does not include the symbol on which the reference signal is located, and the symbol that corresponds to the first resource and that is determined by the network device is consistent with the symbol that corresponds to the first resource and that is determined by the terminal device.

Optionally, in this implementation, the network device may send first indication information to the terminal device, and correspondingly, the terminal device receives the first indication information from the network device. The first indication information includes an offset value, where the offset value identifies a spacing between the third symbol and the fourth symbol, and a unit of the spacing may be a symbol, or may be another time domain unit. Alternatively, the first indication information includes location information of the fourth symbol. For example, based on the example shown in FIG. 7A, the first indication information may include an offset value 1, that is, indicates that the spacing between the third symbol and the fourth symbol is one symbol. Alternatively, the first indication information may include location information of the $3^{rd}$ symbol in the subframe 1, for example, an identifier of the $3^{rd}$ symbol, and indicates to adjust the symbol on which the reference signal is located from the $4^{th}$ symbol to the $3^{rd}$ symbol.

The network device may first determine the symbol corresponding to the first resource, and then send the first indication information to the terminal device, or may first send the first indication information to the terminal device, and then determine, with reference to the first indication information and the resource configuration information, the symbol corresponding to the first resource. This is not specifically limited in the embodiments of this application.

Optionally, in this implementation, if the m symbols included in the first time unit include a fifth symbol, the fifth symbol is the symbol on which the reference signal is located, and indication information corresponding to the fifth symbol indicates that the fifth symbol is not the symbol corresponding to the first resource, the communication method provided in this embodiment of this application further includes: The terminal device adjusts the symbol on which the reference signal is located from the fifth symbol to a sixth symbol. A spacing between the fifth symbol and the sixth symbol is equal to the spacing between the third symbol and the fourth symbol. In addition, an adjustment direction of adjusting the fifth symbol to the sixth symbol is consistent with an adjustment direction of adjusting the third symbol to the fourth symbol. For example, if the symbol on which the reference signal is located is adjusted forward from the third symbol to the fourth symbol, the symbol on which the reference signal is located is adjusted forward from the fifth symbol to the sixth symbol; or if the symbol on which the reference signal is located is adjusted backward from the third symbol to the fourth symbol, the symbol on which the reference signal is located is adjusted backward from the fifth symbol to the sixth symbol.

Figure 7B:
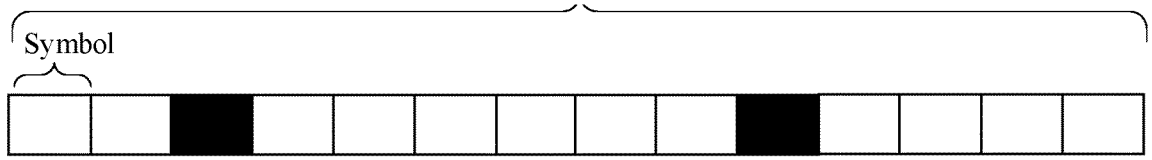
FIG. 7B is a diagram of symbols on which a reference signal is located according to an embodiment of this application.

For example, based on the example shown in FIG. 7A, if the $11^{th}$ symbol in the subframe 1 is the symbol on which the reference signal is located, and indication information corresponding to the $11^{th}$ symbol indicates that the $11^{th}$ symbol is not the symbol corresponding to the first resource, the terminal device adjusts the symbol on which the reference signal is located from the 11$^{th}$ symbol to the 10$^{th}$ symbol. As shown in FIG. 7B, symbols on which the reference signal is located and obtained through adjustment are the 3$^{rd}$ symbol and the 10$^{th}$ symbol in the subframe 1.

In the solution, because the terminal device may correspondingly adjust the symbol on which the reference signal is located from the fifth symbol to the sixth symbol, it can be ensured that locations, relative to each other, of at least two symbols on which the reference signal is located remain unchanged compared with locations that are before the adjustment, to avoid a location change of the reference signal. In this way, it is ensured that a set of filtering parameters may be used for channel estimation, and implementation complexity of channel estimation is reduced.

It should be noted that, in this implementation, the network device may alternatively adjust the fifth symbol to the sixth symbol, so that the symbol on which the reference signal is located and that is determined by the network device is consistent with the symbol on which the reference signal is located and that is determined by the terminal device.

Optionally, after the terminal device and the network device determine the symbol corresponding to the first resource, when data transmission is to be performed between the terminal device and the network device subsequently, the terminal device and the network device discard (or delete) data carried by the symbol corresponding to the first resource. In other words, the symbol corresponding to the first resource is counted during resource mapping but is not used for data transmission.

It should be noted that the data carried by the symbol corresponding to the first resource should be discarded or deleted before data transmission. The terminal device and the network device count the first resource during resource mapping, but the data carried by the symbol corresponding to the first resource is discarded (or deleted), and is not used for data transmission.

For example, five symbols in the first time unit are used for data transmission between the terminal device and the network device. The 3$^{rd}$ symbol is configured as the symbol corresponding to the first resource. The terminal device and the network device count, during resource mapping, the symbol corresponding to the first resource. If data of resource mapping is {a, b, c, d, e}, and a, b, c, d, and e are sequentially mapped to the five symbols, data c on the 3$^{rd}$ symbol occupied by the first resource before data transmission is discarded (or deleted). Data actually transmitted between the terminal device and the network device is {a, b, d, e}.

In conclusion, based on the communication method provided in the embodiments of this application, when a resource is reserved, the symbol on which the reference signal is located is not used as the symbol corresponding to the first resource. Therefore, the network device does not perform data scheduling of another terminal device on the symbol on which the reference signal is located, so that a conflict between the reference signal corresponding to the terminal device and data transmission of the another terminal device can be avoided, and impact on channel estimation performance of the terminal device and data transmission performance of the another terminal device due to the conflict can be avoided.

Figure 8:
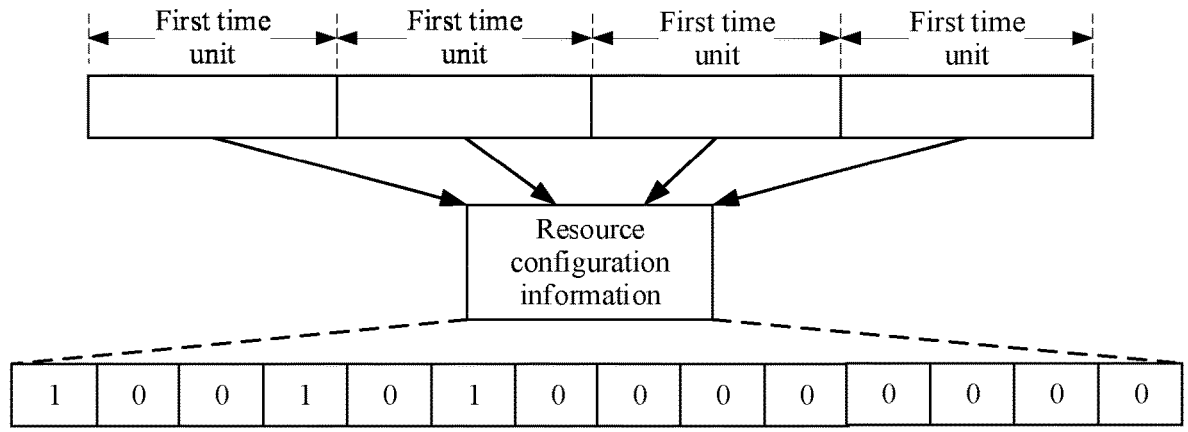
FIG. 8 is a diagram of a usage scenario of resource configuration information according to an embodiment of this application.

It should be noted that, in the embodiments of this application, the terminal device and the network device may determine, based on the resource configuration information by using the first time unit as a periodicity, a symbol that corresponds to the first resource and that is in each first time unit. A start location of each first time unit may be determined based on at least one of a frame number, a subframe number, a slot number, or a symbol number. For example, a start frame of the first time unit is a frame satisfying SFN mod x=0, where the SFN is a frame number, x is a preset value, and x is a positive integer. For example, as shown in FIG. 8, four first time units are included in the figure. If the resource configuration information is "00010000010000", the terminal device and the network device determine, based on the resource configuration information, a symbol that corresponds to the first resource and that is in each of the four first time units.

It should be noted that, in the embodiments of this application, in a second time unit including a plurality of first time units, the network device may send the resource configuration information to the terminal device only once, and the terminal device and the network device may determine, based on the resource configuration information, a symbol that corresponds to the first resource and that is in the second time unit.

For example, the network device may send second indication information to the terminal device. The second indication information includes indication information corresponding to each first time unit included in the second time unit. The indication information corresponding to the first time unit may indicate whether a symbol that corresponds to the first resource and that is in the first time unit needs to be determined based on the resource configuration information. A start location of each second time unit may be determined based on at least one of a frame number, a subframe number, a slot number, or a symbol number. For example, a start frame of the second time unit is a frame satisfying SFN mod y=0, where the SFN is a frame number, y is a preset value, and y is a positive integer.

Figure 9:
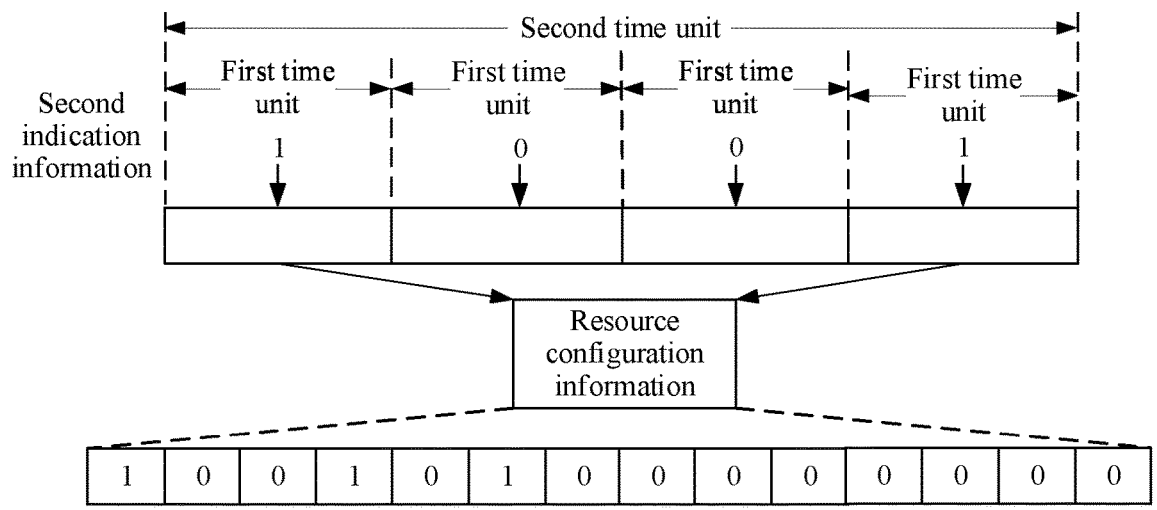
FIG. 9 is a diagram of a usage scenario of another type of resource configuration information according to an embodiment of this application.

For example, as shown in FIG. 9, the second time unit includes four first time units. Indication information corresponding to the four first time units each is "1001". "1" represents that a symbol that corresponds to the first resource and that is in the first time unit needs to be determined based on resource configuration information. "0" indicates that the symbol that corresponds to the first resource and that is in the first time unit does not need to be determined based on the resource configuration information, that is, indicates that there is no symbol corresponding to the first resource in the first time unit. Therefore, the terminal device and the network device determine, based on the resource configuration information, symbols that correspond to the first resource and that are in the 1$^{st}$ first time unit and the 4$^{th}$ first time unit included in the second time unit.

Optionally, in an implementation scenario of the disclosed embodiments, for the first communication system that is accessed by the terminal device and in which uplink transmission supports P subcarrier spacings, because a larger subcarrier spacing indicates shorter duration of a symbol corresponding to the subcarrier spacing, in step S401, when determining the resource configuration information, the network device may determine the resource configuration information based on a first subcarrier spacing. Alternatively, it may be understood as that the network device configures the resource configuration information based on a first subcarrier spacing. In other words, the resource configuration information is determined based on the first subcarrier spacing. In other words, the resource configuration information is configured based on the first subcarrier spacing. P is a positive integer greater than or equal to 2. The first subcarrier spacing is a largest subcarrier spacing in the P subcarrier spacings. That is, the network device reserves the resource based on the largest subcarrier spacing. In this case, more precise resource reservation can be implemented.

For example, the first communication system is the NB-IoT system. The terminal device may use a subcarrier spacing of 3.75 kHz or a subcarrier spacing of 15 kHz during uplink transmission. In this case, the network device may determine the resource configuration information based on the subcarrier spacing of 15 kHz. In addition, if the NB-IoT system coexists with the NR system, because a minimum subcarrier spacing currently supported by the NR system is 15 kHz, the resource is reserved based on 15 kHz in the NB-IoT system. In this way, resources can be better dynamically shared with the NR system.

In this scenario, correspondingly, in step S402, the resource configuration information received by the terminal device is the resource configuration information determined by the network device based on the first subcarrier spacing. In step S403, the terminal device determines, with reference to the resource configuration information and a second subcarrier spacing, a symbol corresponding to the first resource at the second subcarrier spacing, where the second subcarrier spacing is a subcarrier spacing actually used when the terminal device performs uplink transmission, and the second subcarrier spacing is configured by the network device.

In an embodiment, when the second subcarrier spacing is the same as the first subcarrier spacing, the terminal device determines, according to the method in the embodiment shown in FIG. 4, the symbol corresponding to the first resource at the second subcarrier spacing; or when the second subcarrier spacing is less than the first subcarrier spacing, the terminal device needs to determine, based on the resource configuration information determined based on the first subcarrier spacing, the symbol corresponding to the first resource at the second subcarrier spacing. Because duration of one symbol corresponding to the first subcarrier spacing is less than duration of one symbol corresponding to the second subcarrier spacing, one symbol that is indicated by the resource configuration information and that may be used as the first resource at the first subcarrier spacing may be included in the duration of the symbol corresponding to the second subcarrier spacing. In this case, when a part of the duration of the symbol on a second subcarrier spacing is indicated by the resource configuration information as a symbol corresponding to the first resource on the first subcarrier spacing, the terminal device determines the symbol on the second subcarrier spacing as the symbol corresponding to the first resource on the second subcarrier spacing. When none of the duration of the symbol on the second subcarrier spacing is indicated by the resource configuration information as the symbol corresponding to the first resource on the first subcarrier spacing, the terminal device determines that the symbol on the second subcarrier spacing is not used as the symbol corresponding to the first resource on the second subcarrier spacing.

Figure 12:
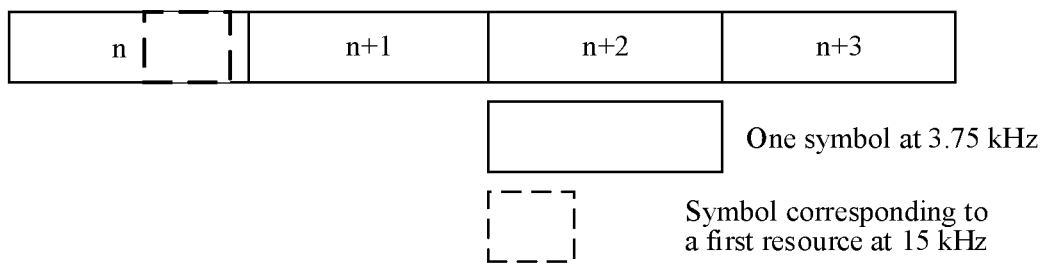
FIG. 12 is a diagram of a location of a symbol corresponding to a first resource according to an embodiment of this application.

For example, the first communication system is the NB-IoT system, the first subcarrier spacing is 15 kHz, and the second subcarrier spacing is 3.75 kHz. As shown in FIG. 12, a dashed-line box indicates duration of one symbol corresponding to 15 kHz, and a solid line box indicates duration of one symbol corresponding to 3.75 kHz. If a part of duration of a symbol n corresponding to 3.75 kHz is indicated by the resource configuration information as a symbol corresponding to the first resource at 15 kHz, the terminal device determines the symbol n as a symbol corresponding to the first resource at 3.75 kHz. If none of duration of a symbol n+1 corresponding to 3.75 kHz is indicated by the resource configuration information as the symbol corresponding to the first resource at 15 kHz, the terminal device determines that the symbol n+1 is not the symbol corresponding to the first resource at 3.75 kHz.

Based on the solution, because the larger subcarrier spacing indicates the shorter duration of the symbol corresponding to the subcarrier spacing, the reserved resource can be more refined by determining the resource configuration information based on a large subcarrier when the terminal device performs uplink transmission by using the large subcarrier.

Figure 13:
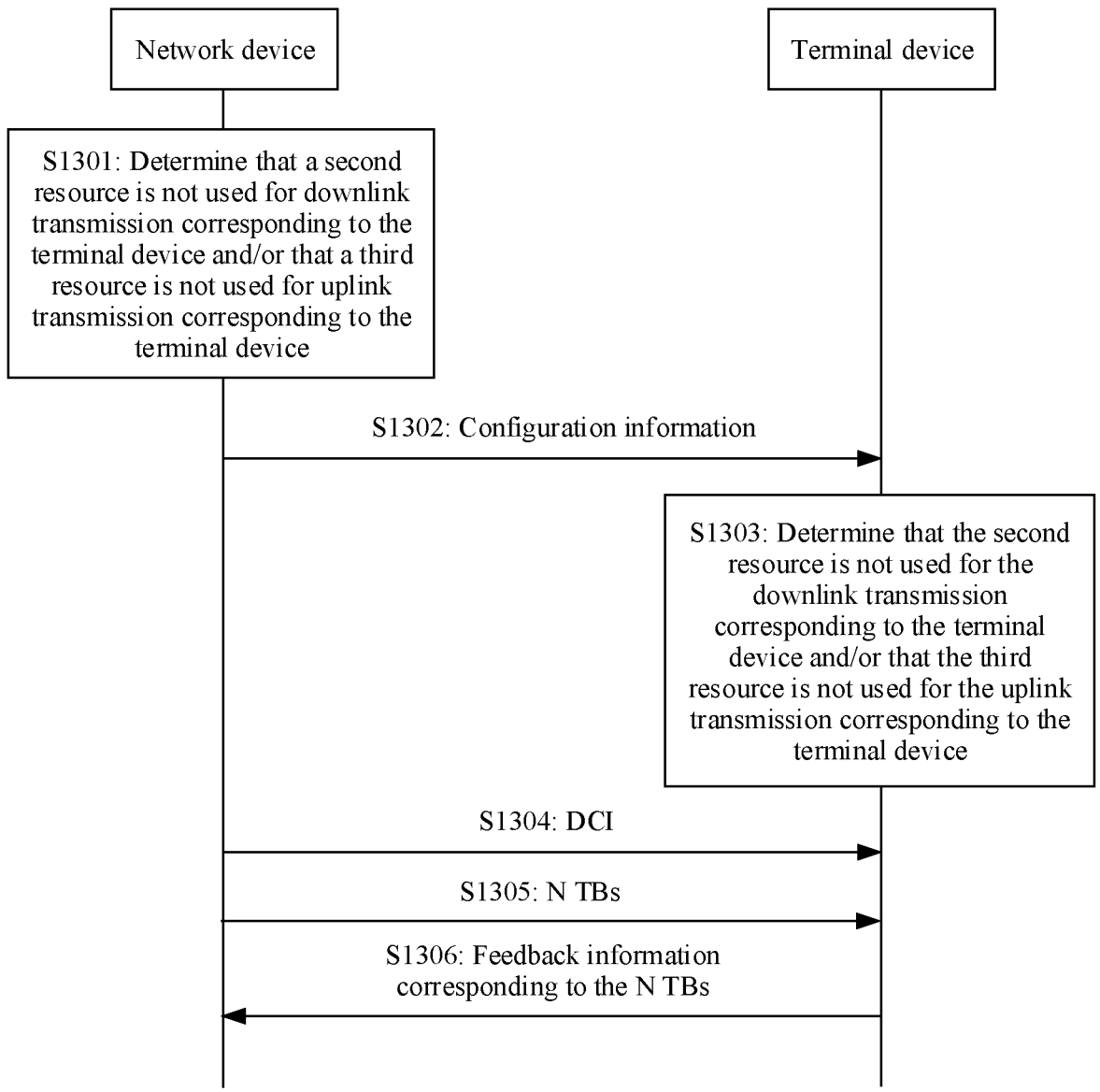
FIG. 13 is a flowchart of another communication method according to an embodiment of this application.

Optionally, FIG. 13 shows another communication method according to an embodiment of this application. The communication method includes the following steps.

S1301: A network device determines that a second resource is not used for downlink transmission corresponding to a terminal device and/or that a third resource is not used for uplink transmission corresponding to the terminal device.

Step S1301 may include: The network device determines configuration information, where the configuration information includes first resource configuration information and/or second resource configuration information.

The first resource configuration information is used by the terminal device to determine a second time unit corresponding to the second resource within first duration, and the second resource is not used for the downlink transmission corresponding to the terminal device. The second resource configuration information is used by the terminal device to determine a third time unit corresponding to the third resource within second duration, and the third resource is not used for the uplink transmission corresponding to the terminal device.

When the configuration information includes the first resource configuration information, the network device determines that the second resource is not used for the downlink transmission corresponding to the terminal device. When the configuration information includes the second resource configuration information, the network device determines that the third resource is not used for the uplink transmission corresponding to the terminal device.

The second time unit may be a subframe, may be a slot, or may be a symbol. Correspondingly, when the second time unit is the subframe, the first duration may include M half-frames, M radio frames (which are also referred to as frames), or M super frames. When the second time unit is the slot, the first duration may include M subframes, M half-frames, M radio frames (which are also referred to as frames), or M super frames. When the second time unit is the symbol, the first duration may include M slots, M subframes, M half-frames, M radio frames (which are also referred to as frames), or M super frames. M is a positive integer. Likewise, a feature of the third time unit is the same as that of the second time unit, and a feature of the second duration is the same as that of the first duration. For details, refer to the descriptions of the second time unit and the first duration. Details are not described herein again.

Optionally, the second resource may be referred to as a downlink reserved resource, the third resource may be referred to as an uplink reserved resource, and the second resource and the third resource may be collectively referred to as a reserved resource. Alternatively, the second resource and the third resource may have other names. This is not specifically limited in the embodiments of this application.

It should be noted that, that the second resource is not used for the downlink transmission corresponding to the terminal device may be understood as that the second resource is used by a second communication system for scheduling, that the network device may schedule the second resource for a terminal device in the second communication system for use, that the network device may schedule the second resource for another terminal device in a first communication system for use, or that the network device may schedule the second resource for the uplink transmission of the terminal device. That the third resource is not used for the uplink transmission corresponding to the terminal device may be understood as that the third resource is used by the second communication system for scheduling, that the network device may schedule the third resource for the terminal device in the second communication system for use, that the network device may schedule the third resource for the another terminal device in the first communication system for use, or that the network device may schedule the third resource for the downlink transmission of the terminal device. For descriptions of the first communication system and the second communication system, refer to the related descriptions in the embodiment shown in FIG. 4. Details are not described herein again.

Optionally, when both the second time unit and the third time unit are symbols, for related descriptions of forms of the first resource configuration information and the second resource configuration information and a manner in which the network device determines the configuration information, refer to step S401. When the network device determines the first resource configuration information and/or the second resource configuration information, the network device may alternatively determine the resource configuration information based on a first subcarrier spacing. For an implementation, refer to the descriptions in the foregoing embodiment. Details are not described herein again.

S1302: The network device sends the configuration information to the terminal device, and correspondingly, the terminal device receives the configuration information from the network device.

S1303: The terminal device determines that the second resource is not used for the downlink transmission corresponding to the terminal device and/or that the third resource is not used for the uplink transmission corresponding to the terminal device.

Step S1301 may include: When the configuration information includes first resource configuration information, the terminal device determines, based on the first resource configuration information, the second time unit corresponding to the second resource, where the second resource is not used for the downlink transmission corresponding to the terminal device; when the configuration information includes the second resource configuration information, the terminal device determines, based on the second resource configuration information, the third time unit corresponding to the third resource, where the third resource is not used for the uplink transmission corresponding to the terminal device; or when the configuration information includes the first resource configuration information and the second resource configuration information, the terminal device determines, based on the first resource configuration information, the second time unit corresponding to the second resource, and the terminal device determines, based on the second resource configuration information, the third time unit corresponding to the third resource.

When the second time unit is the symbol, the second time unit corresponding to the second resource does not include a symbol on which a reference signal is located within the first duration. When the third time unit is the symbol, the third time unit corresponding to the third resource does not include a symbol on which the reference signal is located within the second duration.

For related descriptions of the reference signal, refer to the descriptions in step S403. Details are not described herein again. When the second time unit and the third time unit are the symbols, for related implementation in which the terminal device determines, based on the first resource configuration information, the second time unit corresponding to the second resource, and determines, based on the second resource configuration information, the third time unit corresponding to the third resource, refer to the related descriptions, in step S403, of determining, by the terminal device based on the resource configuration information, the symbol corresponding to the first resource. Details are not described herein again.

S1304: The network device sends downlink control information (DCI) to the terminal device, and correspondingly, the terminal device receives the DCI from the network device.

The DCI is used to schedule N TBs and feedback information corresponding to the N TBs. The feedback information is used to indicate whether the N TBs are successfully received, and the feedback information may be, for example, an acknowledgement (ACK)/a negative acknowledgement (NACK). N is a positive integer.

Optionally, in an NB-IoT system, the ACK or NACK feedback information is carried by using a narrowband physical uplink shared channel (NPUSCH) format 2. In an LTE-M system, an eMTC system, an LTE system, or an NR system, the ACK or NACK feedback information is carried by using a physical uplink control channel (PUCCH).

The DCI may include first information, and the first information is used to determine a time-frequency resource for transmitting feedback information corresponding to the N transport blocks (TB) scheduled by using the DCI.

When the configuration information in step S1301 includes the first resource configuration information, the DCI may further include second information. When the configuration information in step S1301 includes the second resource configuration information, the DCI may further include third information. When the configuration information in step S1301 includes the first resource configuration information and the second resource configuration information, the DCI may further include second information and third information.

The second information is used to indicate whether a part or all of second time units corresponding to the second resource can be used during transmission of the N TBs, that is, when a time domain resource for transmitting the N TBs includes the part or all of the second time units corresponding to the second resource, whether the part or all of the second time units corresponding to the second resource can be used to transmit one or more of the N TBs. The third information is used to indicate whether a part or all of third time units corresponding to the third resource can be used during transmission of the feedback information corresponding to the N TBs, that is, when a time domain resource indicated by the first information includes the part or all of the third time units corresponding to the third resource, whether the part or all of the third time units corresponding to the third resource can be used to transmit a part or all of the feedback information corresponding to the N TBs.

Optionally, when the network device does not schedule the second resource for the terminal device in the second communication system for use, does not schedule the second resource for the another terminal device in the first communication system for use, or does not schedule the second resource for the uplink transmission of the terminal device, the second information is used to indicate that the part or all of the second time units corresponding to the second resource can be used during transmission of the N TBs.

Optionally, when the network device does not schedule the third resource for the terminal device in the second communication system for use, does not schedule the third resource for the another terminal device in the first communication system for use, or does not schedule the third resource for the downlink transmission of the terminal device, the third information is used to indicate that the part or all of third time units corresponding to the third resource can be used during transmission of the feedback information corresponding to the N TBs.

Optionally, the network device may jointly indicate the second information and the third information. For example, the second information and the third information occupy a same field in the DCI, the field may indicate one index, and different indexes correspond to different second information and different third information. For example, when the index is 1, corresponding second information indicates that the part or all of the second time units corresponding to the second resource can be used during transmission of the N TBs, and the third information indicates that the part or all of third time units corresponding to the third resource can be used during transmission of the feedback information corresponding to the N TBs. Alternatively, the network device may separately indicate the second information and the third information. For example, the second information and the third information separately occupy different fields in the DCI, different values of the field occupied by the second information represent different content of the second information, and different values of the field occupied by the third information represent different content of the third information. Forms of the second information and the third information are not specifically limited in the embodiments of this application.

Optionally, in the embodiments, for the NB-IoT system, a format of the DCI may be a format N1; for the LTE-M system or the eMTC system, a format of the DCI is a format 6-1A, or the format of the DCI is 6-1B; for the NR system, a format of the DCI may be a format 1-0 or a format 1-1.

Optionally, in the embodiments, a cyclic redundancy check (CRC) code of the DCI is scrambled by using a cell radio network temporary identifier (C-RNTI) or a semi-persistent scheduling (SPS) C-RNTI.

Optionally, in the embodiments, for the NB-IoT system, the DCI including the second information and/or the third information is mapped to at least one of the following search space: narrowband physical downlink control channel (NPDCCH) UE-specific search space (USS), Type1 NPDCCH common search space (CSS), or Type2 NPDCCH CSS. For the LTE-M system or the eMTC system, the format of the DCI including the second information and/or the third information is mapped to at least one of the following search space: MTC physical downlink control channel (MPDCCH) UE-specific search space (USS), Type1 MPDCCH common search space (CSS), Type2 MPDCCH CSS, or Type® MPDCCH CSS.

S1305: The network device sends the N TBs to the terminal device, and correspondingly, the terminal device receives the N TBs.

In the embodiments of this application, an example in which the second information is used to indicate that the part or all of the second time units corresponding to the second resource can be used during transmission of the N TBs is used for description.

In this case, that the network device sends the N TBs to the terminal device is: The network device sends the N TBs to the terminal device on a first time domain resource including the part or all of the second time units corresponding to the second resource. The first time domain resource is all time domain resources used to transmit the N TBs.

The first time domain resource may be determined based on scheduling information in the DCI. In other words, before step S1305, the communication method provided in this embodiment may further include: The terminal device determines the first time domain resource based on the scheduling information. For example, the scheduling information includes a latency between a first moment and a start moment of transmission of the N TBs, where the first moment is a moment that equals an end moment of transmission of the DCI plus T fourth time units, and T is a positive integer greater than or equal to 0. The fourth time unit is a radio frame (which may also be referred to as a frame), a subframe, a slot, or a symbol. The terminal device may determine the end moment of transmission of the DCI, and determine the first time domain resource based on the end moment of transmission of the DCI, the latency, and a quantity of repetitions of transmission of the N TBs, where the quantity of repetitions may be configured by the network device, and sent to the terminal device.

Correspondingly, that the terminal device receives the N TBs is: The terminal device receives the N TBs from the network device based on the second information on the first time domain resource including the part or all of the second time units corresponding to the second resource.

S1306: The terminal device sends the feedback information corresponding to the N TBs to the network device, and correspondingly, the network device receives the feedback information that corresponds to the N TBs and that is from the terminal device.

In the embodiments of this application, an example in which the third information is used to indicate that the part or all of the third time units corresponding to the third resource can be used during transmission of the feedback information corresponding to the N TBs is used for description.

In this case, that the terminal device sends the feedback information corresponding to the N TBs to the network device is: The terminal device sends the feedback information corresponding to the N TBs to the network device based on the third information on a second time domain resource including the part or all of the third time units corresponding to the third resource.

It should be noted that, in the embodiments of this application, the second time domain resource is all time domain resources used to transmit the feedback information corresponding to the N TBs, and the second time domain resource may be determined based on the first information. In other words, before step S1306, the communication method provided in this embodiment may further include: The terminal device determines the second time domain resource based on the first information. For example, the first information may indicate a latency between an end moment of transmission of the N TBs and a start moment of transmission of the ACK/NACK corresponding to the N TBs. In this case, the terminal device may determine the end moment of transmission of the N TBs, and determine the second time domain resource based on the end moment of transmission of the N TBs, the latency, and a quantity of repetitions of transmission of the ACK/NACK corresponding to the N TBs, where the quantity of repetitions may be configured by the network device, and sent to the terminal device.

Correspondingly, that the network device receives the feedback information that corresponds to the N TBs and that is from the terminal device is: The network device receives, on the second time domain resource including the part or all of the third time units corresponding to the third resource, the feedback information that corresponds to the N TBs and that is from the terminal device.

Based on the solution, when the reserved resource is not used by the second communication system, it may be dynamically indicated in time by using the DCI that the reserved resource may be used for downlink transmission of the first communication system or transmission of feedback information corresponding to downlink data. In this way, the reserved resource can be used to perform data transmission of the first communication system, to avoid a resource waste. In addition, the network device separately indicates, in the DCI, that the uplink reserved resource and/or the downlink reserved resource may be used for data transmission of the first communication system, and implementation is more flexible.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all operations in embodiments of this application may be performed.

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The foregoing mainly describes the solutions provided in embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes corresponding hardware structures and/or software modules for performing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logical function division. Another division manner may be used during actual implementation.

Figure 10:
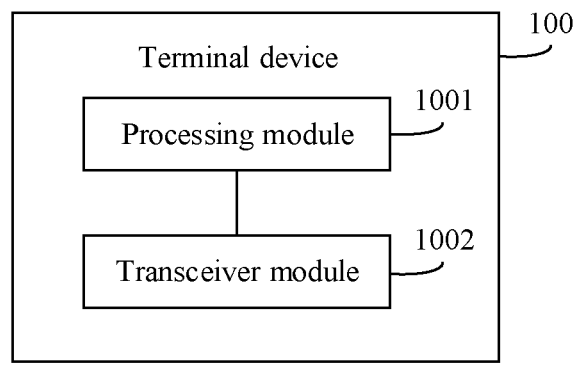
FIG. 10 is a diagram of a communication apparatus according to an embodiment of this application.

For example, the communication apparatus is the terminal device in the foregoing method embodiments. FIG. 10 is a diagram of a terminal device 100. The terminal device 100 includes a processing module 1001 and a transceiver module 1002. The transceiver module 1002 may also be referred to as a transceiver unit, and is configured to implement a sending and/or receiving function. For example, the transceiver module 1002 may be a transceiver circuit, a transceiver, a transceiver, or a communication interface.

In an embodiment:

The transceiver module 1002 is configured to receive resource configuration information from a network device. The processing module 1001 is configured to determine, based on the resource configuration information, a symbol that corresponds to a first resource and that is in a first time unit, where the symbol corresponding to the first resource does not include a symbol on which a reference signal is located and that is in the first time unit, and the first resource is not used for data transmission corresponding to the communication apparatus.

Optionally, when the first time unit includes m symbols, the resource configuration information includes indication information corresponding to the m symbols, that the processing module 1001 is configured to determine, based on the resource configuration information, a symbol that corresponds to a first resource and that is in a first time unit includes: if a second symbol is the symbol on which the reference signal is located, and indication information corresponding to the second symbol indicates that the second symbol is the symbol corresponding to the first resource, the processing module 1001 is configured to determine that the symbol corresponding to the first resource does not include the second symbol; or if a second symbol is not the symbol on which the reference signal is located, and indication information corresponding to the second symbol indicates that the second symbol is the symbol corresponding to the first resource, the processing module 1001 is configured to determine that the symbol corresponding to the first resource includes the second symbol.

Optionally, when the first time unit includes m symbols, the resource configuration information includes indication information corresponding to the m symbols, that the processing module 1001 is configured to determine, based on the resource configuration information, a symbol that corresponds to a first resource and that is in a first time unit includes:

if a third symbol is the symbol on which the reference signal is located, and indication information corresponding to the third symbol indicates that the third symbol is the symbol corresponding to the first resource, the processing module 1001 is configured to adjust the symbol on which the reference signal is located from the third symbol to a fourth symbol, and determine that the symbol corresponding to the first resource includes the third symbol; or if a third symbol is not the symbol on which the reference signal is located, and indication information corresponding to the third symbol indicates that the third symbol is the symbol corresponding to the first resource, the processing module 1001 is configured to determine that the symbol corresponding to the first resource includes the third symbol.

Optionally, when the m symbols include a fifth symbol, the processing module 1001 is further configured to adjust the symbol on which the reference signal is located from the fifth symbol to a sixth symbol.

Optionally, the transceiver module 1002 is further configured to receive first indication information from the network device, where the first indication information includes an offset value, and the offset value represents a spacing between the third symbol and the fourth symbol; or the first indication information includes location information of the fourth symbol.

Optionally, the processing module 1001 is further configured to discard data carried by the symbol corresponding to the first resource.

In an embodiment:

The processing module 1001 is configured to determine that a second resource is not used for downlink transmission corresponding to the terminal device and/or that a third resource is not used for uplink transmission corresponding to the terminal device.

The transceiver module 1002 is configured to receive downlink control information DCI from a network device, where the DCI is used to schedule N transport blocks TBs and feedback information corresponding to the N TBs, the DCI includes second information and/or third information, the second information is used to indicate that a part or all of second time units corresponding to the second resource can be used during transmission of the N TBs, and the third information is used to indicate that a part or all of third time units corresponding to the third resource can be used during transmission of the feedback information corresponding to the N TBs.

When the DCI includes the second information, the transceiver module 1002 is further configured to receive the N TBs from the network device on a first time domain resource based on the second information, where the first time domain resource includes the part or all of the second time units corresponding to the second resource; or when the DCI includes the third information, the transceiver module 1002 is further configured to send the feedback information corresponding to the N TBs to the network device on a second time domain resource based on the third information, where the second time domain resource includes the part or all of the third time units corresponding to the third resource.

Optionally, the transceiver module 1002 is further configured to receive configuration information from the network device, where the configuration information includes first resource configuration information and/or second resource configuration information. That the processing module 1001 is configured to determine that a second resource is not used for downlink transmission corresponding to the terminal device and/or that a third resource is not used for uplink transmission corresponding to the terminal device includes: When the configuration information includes the first resource configuration information, the processing module 1001 is configured to determine, based on the first resource configuration information, a second time unit corresponding to the second resource within first duration, where the second resource is not used for the downlink transmission corresponding to the terminal device, and correspondingly, the DCI includes the second information; or when the configuration information includes the second resource configuration information, the processing module 1001 is configured to determine, based on the second resource configuration information, a third time unit corresponding to the third resource within second duration, where the third resource is not used for the uplink data transmission corresponding to the terminal device, and correspondingly, the DCI includes the third information.

Optionally, the DCI further includes first information, and the first information is used to determine a time-frequency resource for transmitting the feedback information corresponding to the N TBs; and the processing module 1001 is further configured to determine the second time domain resource based on the first information.

All related content of the steps in the foregoing method embodiments may be cited in function descriptions of the corresponding function modules. Details are not described herein again.

In this embodiment, the terminal device 100 is presented in a form of function modules obtained through division in an integrated manner. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the terminal device 100 may be in a form of the terminal device 30 shown in FIG. 2.

For example, the processor 301 in the terminal device 30 shown in FIG. 2 may invoke the computer-executable instructions stored in the memory 302, to enable the terminal device 30 to perform the communication methods in the foregoing method embodiments.

The processor 301 in the terminal device 30 shown in FIG. 2 may invoke the computer-executable instructions stored in the memory 302, to implement functions/implementation processes of the processing module 1001 and the transceiver module 1002 in FIG. 10. Alternatively, the processor 301 in the terminal device 30 shown in FIG. 2 may invoke the computer-executable instructions stored in the memory 302, to implement functions/implementation processes of the processing module 1001 in FIG. 10, and the transceiver 303 in the terminal device 30 shown in FIG. 2 may implement functions/implementation processes of the transceiver module 1002 in FIG. 10.

The terminal device 100 provided in this embodiment may perform the communication methods. Therefore, for technical effects that can be achieved by the terminal device 100, refer to the foregoing method embodiments. Details are not described herein again.

Figure 11:
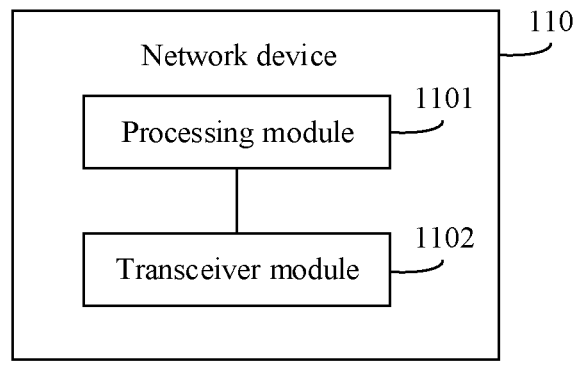
FIG. 11 is a diagram of another communication apparatus according to an embodiment of this application.

Alternatively, for example, the communication apparatus is the network device in the foregoing method embodiments. FIG. 11 is a diagram of a network device 110. The network device 110 includes a processing module 1101 and a transceiver module 1102. The transceiver module 1102 may also be referred to as a transceiver unit, configured to implement a sending and/or receiving function. For example, the transceiver module 1102 may be a transceiver circuit, a transceiver, a transceiver, or a communication interface.

In an embodiment:

The processing module 1001 is configured to determine resource configuration information. The transceiver module 1002 is configured to send the resource configuration information to a terminal device. The resource configuration information is used by the terminal device to determine a symbol that corresponds to a first resource and that is in a first time unit, where the symbol corresponding to the first resource does not include a symbol on which a reference signal is located and that is in the first time unit, and the first resource is not used for data transmission corresponding to the terminal device.

Optionally, when the first time unit includes m symbols, and the resource configuration information includes indication information corresponding to the m symbols, if a second symbol is the symbol on which the reference signal is located, and indication information corresponding to the second symbol indicates that the second symbol is the symbol corresponding to the first resource, the processing module 1101 is further configured to determine that the symbol corresponding to the first resource does not include the second symbol; or if a second symbol is not the symbol on which the reference signal is located, and indication information corresponding to the second symbol indicates that the second symbol is the symbol corresponding to the first resource, the processing module 1101 is further configured to determine that the symbol corresponding to the first resource includes the second symbol.

Optionally, when the first time unit includes m symbols, and the resource configuration information includes indication information corresponding to the m symbols, if a third symbol is the symbol on which the reference signal is located, and indication information corresponding to the third symbol indicates that the third symbol is the symbol corresponding to the first resource, the processing module 1101 is further configured to adjust the symbol on which the reference signal is located from the third symbol to a fourth symbol, and determine that the symbol corresponding to the first resource includes the third symbol; or if a third symbol is not the symbol on which the reference signal is located, and indication information corresponding to the third symbol indicates that the third symbol is the symbol corresponding to the first resource, the processing module 1101 is further configured to determine that the symbol corresponding to the first resource includes the third symbol.

Optionally, when them symbols include a fifth symbol, the processing module 1101 is further configured to adjust the symbol on which the reference signal is located from the fifth symbol to a sixth symbol.

Optionally, the transceiver module 1002 is further configured to send first indication information to the terminal device, where the first indication information includes an offset value, and the offset value represents a spacing between the third symbol and the fourth symbol; or the first indication information includes location information of the fourth symbol.

Optionally, the processing module 1001 is further configured to discard data carried by the symbol corresponding to the first resource.

In an embodiment:

The processing module 1101 is configured to determine that a second resource is not used for downlink transmission corresponding to a terminal device and/or that a third resource is not used for uplink transmission corresponding to the terminal device.

The transceiver module 1102 is configured to send downlink control information DCI to the terminal device, where the DCI is used to schedule N transport blocks TBs and feedback information corresponding to the N TBs, the DCI includes second information and/or third information, the second information is used to indicate that a part or all of second time units corresponding to the second resource can be used during transmission of the N TBs, and the third information is used to indicate that a part or all of third time units corresponding to the third resource can be used during transmission of the feedback information corresponding to the N TBs.

When the DCI includes the second information, the transceiver module 1102 is further configured to send the N TBs to the terminal device on a first time domain resource, where the first time domain resource includes the part or all of the second time units corresponding to the second resource; or when the DCI includes the third information, the transceiver module 1102 is further configured to receive, from the terminal device on a second time domain resource, the feedback information corresponding to the N TBs, where the second time domain resource includes the part or all of the third time units corresponding to the third resource.

Optionally, that the processing module 1101 is configured to determine that a second resource is not used for downlink transmission corresponding to a terminal device and/or that a third resource is not used for uplink transmission corresponding to the terminal device includes: The processing module 1101 is configured to determine configuration information, where the configuration information includes first resource configuration information and/or second resource configuration information, the first resource configuration information is used by the terminal device to determine a second time unit corresponding to the second resource within first duration, and the second resource configuration information is used by the terminal device to determine a third time unit corresponding to the third resource within second duration; and when the configuration information includes the first resource configuration information, the processing module 1101 is configured to determine that the second resource is not used for the downlink transmission corresponding to the terminal device, and correspondingly, the DCI includes the second information; or when the configuration information includes the second resource configuration information, the processing module 1101 is configured to determine that the third resource is not used for the uplink data transmission corresponding to the terminal device, and correspondingly, the DCI includes the third information.

Optionally, the transceiver module 1102 is further configured to send the configuration information to the terminal device.

All related content of the steps in the foregoing method embodiments may be cited in function descriptions of the corresponding function modules. Details are not described herein again.

In this embodiment, the network device 110 is presented in a form of function modules obtained through division in an integrated manner. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the network device 110 may be in a form of the network device 20 shown in FIG. 2.

For example, the processor 201 in the network device 20 shown in FIG. 2 may invoke computer-executable instructions stored in the memory 202, to enable the network device 20 to perform the communication methods in the foregoing method embodiments.

The processor 201 in the network device 20 shown in FIG. 2 may invoke the computer-executable instructions stored in the memory 202, to implement functions/implementation processes of the processing module 1101 and the transceiver module 1102 in FIG. 11. Alternatively, the processor 201 in the network device 20 shown in FIG. 2 may invoke the computer-executable instructions stored in the memory 202, to implement functions/implementation processes of the processing module 1101 in FIG. 11, and the transceiver 203 in the network device 20 shown in FIG. 2 may implement functions/implementation processes of the transceiver module 1102 in FIG. 11.

The network device 110 provided in this embodiment may perform the communication methods. Therefore, for technical effects that can be achieved by the network device 110, refer to the foregoing method embodiments. Details are not described herein again.

Optionally, an embodiment of this application further provides a communication apparatus (where for example, the communication apparatus may be a chip or a chip system). The communication apparatus includes a processor, configured to implement the method in any one of the foregoing method embodiments. In an embodiment, the communication apparatus further includes a memory. The memory is configured to store necessary program instructions and data. The processor may invoke program code stored in the memory, to indicate the communication apparatus to perform the method in any one of the foregoing method embodiments. Certainly, the memory may alternatively not be located in the communication apparatus. In an embodiment, the communication apparatus further includes an interface circuit. The interface circuit is a code/data read/write interface circuit, and the interface circuit is configured to: receive computer-executable instructions (where the computer-executable instructions are stored in a memory, may be directly read from the memory, or may be read by using another component), and transmit the computer-executable instructions to the processor. When the communication apparatus is the chip system, the communication apparatus may include a chip, or may include the chip and another discrete component. This is not specifically limited in the embodiments of this application.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like. In the embodiments of this application, the computer may include the apparatuses described above.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of and all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, comprising:
receiving, by a communication apparatus in a first communication system, resource configuration information from a network device; and
determining, by the first communication system based on the resource configuration information, at least one symbol in a first time unit, wherein the at least one symbol is counted during resource mapping but is not used for data transmission in the first communication system, and the at least one symbol is not used for carrying on which a reference signal.

2. The method according to claim 1, wherein the resource configuration information comprises indication information corresponding to n symbols in the first time unit other than a symbol used for carrying the reference signal, a first indication information corresponding to a first symbol indicating whether the at least one symbol comprises the first symbol, the first symbol is one of the n symbols, and n is a positive integer.

3. The method according to claim 1, wherein the reference signal comprises one or more of the following: a narrowband reference signal (NRS), a narrowband positioning reference signal (NPRS), a demodulation reference signal (DMRS), or a cell-specific reference signal (CRS).

4. The method according to claim 1, wherein the resource configuration information is determined based on a first subcarrier spacing, the first subcarrier spacing being a largest subcarrier spacing in P subcarrier spacings supported by uplink transmission in the first communication system accessed by the communication apparatus, and P being a positive integer greater than or equal to 2.

5. The method according to claim 1, wherein the communication apparatus is a terminal or a chip in a terminal.

6. A communication method, comprising:
   determining, by a network device, resource configuration information used by a terminal device in a first communication system to determine at least one symbol in a first time unit, wherein the at least one symbol is counted during resource mapping but is not used for data transmission in the first communication system, and the at least one symbol is not used for carrying a reference signal; and
   sending, by the network device, the resource configuration information to the terminal device.

7. The method according to claim 6, wherein the resource configuration information comprises indication information corresponding to n symbols in the first time unit other than a symbol used for carrying on which the reference signal, a first indication information corresponding to a first symbol indicating whether the at least one symbol comprises the first symbol, the first symbol is one of the n symbols, and n is a positive integer.

8. The method according to claim 6, wherein the reference signal comprises one or more of the following: a narrowband reference signal (NRS), a narrowband positioning reference signal (NPRS), a demodulation reference signal (DMRS), or a cell-specific reference signal (CRS).

9. The method according to claim 6, wherein the resource configuration information is determined based on a first subcarrier spacing, the first subcarrier spacing being a largest subcarrier spacing in P subcarrier spacings supported by uplink transmission in the first communication system accessed by the terminal device, and P being a positive integer greater than or equal to 2.

10. A communication apparatus in a first communication system, comprising:
    a memory storing instructions; and
    at least one processor in communication with the memory, the at least one processor configured, upon execution of the instructions, to cause the apparatus to:
    receive resource configuration information from a network device; and
    determine, based on the resource configuration information, at least one symbol in a first time unit, wherein the at least one symbol is counted during resource mapping but is not used for data transmission in the first communication system, and the at least one symbol is not used for carrying a reference signal.

11. The communication apparatus according to claim 10, wherein the resource configuration information comprises indication information corresponding to n symbols in the first time unit other than a symbol used for carrying the reference signal, a first indication information corresponding to a first symbol indicating whether the at least one symbol comprises the first symbol, the first symbol is one of the n symbols, and n is a positive integer.

12. The communication apparatus according to claim 10, wherein the reference signal comprises one or more of the following: a narrowband reference signal (NRS), a narrowband positioning reference signal (NPRS), a demodulation reference signal (DMRS), or a cell-specific reference signal (CRS).

13. A communication apparatus, comprising:
    a memory storing instructions; and
    at least one processor in communication with the memory, the at least one processor configured, upon execution of the instructions, to cause the apparatus to:
    determine resource configuration information, the resource configuration information being used by a terminal device in a first communication system to determine at least one symbol in a first time unit, wherein the at least one symbol is counted during resource mapping but is not used for data transmission in the first communication system, and the at least one symbol is not used for carrying a reference signal; and
    send the resource configuration information to the terminal device.

14. The communication apparatus according to claim 13, wherein the resource configuration information comprises indication information corresponding to n symbols in the first time unit other than a symbol used for carrying the reference signal, a first indication information corresponding to a first symbol indicating whether the at least one symbol comprises the first symbol, the first symbol is one of the n symbols, and n is a positive integer.

15. The communication apparatus according to claim 13, wherein the reference signal comprises one or more of the following: a narrowband reference signal (NRS), a narrowband positioning reference signal (NPRS), a demodulation reference signal (DMRS), or a cell-specific reference signal (CRS).

* * * * *